(12) United States Patent
Kofford et al.

(10) Patent No.: US 12,303,352 B2
(45) Date of Patent: May 20, 2025

(54) OMNI-DIRECTIONAL MULTI-UNIT ABUTMENT DENTAL SYSTEMS

(71) Applicant: Full Arch Solutions, LLC, Apex, NC (US)

(72) Inventors: Brandon Dale Kofford, Apex, NC (US); Charles Albert Rudisill, Apex, NC (US)

(73) Assignee: Full Arch Solutions, LLC, Apex, NC (US)

( * ) Notice: Subject to any disclaimer, the term of this patent is extended or adjusted under 35 U.S.C. 154(b) by 0 days.

(21) Appl. No.: 18/750,317

(22) Filed: Jun. 21, 2024

(65) Prior Publication Data
US 2024/0335262 A1  Oct. 10, 2024

Related U.S. Application Data

(63) Continuation-in-part of application No. 17/832,143, filed on Jun. 3, 2022, now Pat. No. 12,178,680.
(Continued)

(51) Int. Cl.
*A61C 8/00* (2006.01)

(52) U.S. Cl.
CPC .......... *A61C 8/0053* (2013.01); *A61C 8/0012* (2013.01); *A61C 8/0062* (2013.01);
(Continued)

(58) Field of Classification Search
CPC ... A61C 8/0053; A61C 8/0022; A61C 8/0098; A61C 8/005; A61C 8/0048;
(Continued)

(56) References Cited

U.S. PATENT DOCUMENTS 3,732,621 A    5/1973    Bostrom
4,109,364 A    8/1978    Wisner
(Continued)

FOREIGN PATENT DOCUMENTS

AT    375012 B    6/1984
CN    107280790 A    10/2017
(Continued)

OTHER PUBLICATIONS

Elshenawy et al., "Cast accuracy obtained from different impression techniques at different implant angulations (in vitro study)", International Journal of Implant Dentistry, 2018; 4.
(Continued)

*Primary Examiner* — Ralph A Lewis
*Assistant Examiner* — Mirayda A Aponte
(74) *Attorney, Agent, or Firm* — Myers Bigel, P.A.

(57) ABSTRACT

Multi-unit abutments aligning dental implants and a prosthesis with copings have a base for implant attachment with a ball and swivel shell at least partially surrounding the ball. The swivel shell is preferentially inelastically deformed to make contact at or above and below the equator of the ball. The forming process restricts motion to swiveling action when a predetermined torque threshold is exceeded. A tool passing through the lock screw may drive the post of the base into the implant with the multi-unit assembly in a linear configuration. The swivel shell is then positioned and fixed at desired tilt and azimuthal angles. In some embodiments, a lock screw remains accessible through an aperture in the prosthesis when positioned on the implant abutment. Copings may be attached with screws or snap-on features. Methods for improving passive alignment of the prosthesis and implants are described.

29 Claims, 11 Drawing Sheets

Related U.S. Application Data

(60) Provisional application No. 63/509,529, filed on Jun. 22, 2023, provisional application No. 63/196,227, filed on Jun. 3, 2021.

(52) U.S. Cl.
CPC .......... *A61C 8/0068* (2013.01); *A61C 8/0069* (2013.01); *A61C 8/0089* (2013.01)

(58) Field of Classification Search
CPC ......... A61C 8/0018; A61C 8/00; A61C 13/02; A61C 13/01; A61C 13/00
USPC ...................................... 433/173–176, 201.1
See application file for complete search history.

(56) References Cited

U.S. PATENT DOCUMENTS

| | | | |
|---|---|---|---|
| 4,713,004 | A | 12/1987 | Linkow et al. |
| 4,793,808 | A | 12/1988 | Kirsch |
| 4,832,601 | A | 5/1989 | Linden |
| 4,842,518 | A * | 6/1989 | Linkow ............... A61C 8/0018 433/174 |
| 4,907,969 | A | 3/1990 | Ward |
| 4,932,868 | A | 6/1990 | Linkow et al. |
| 4,988,297 | A | 1/1991 | Lazzara et al. |
| 5,133,662 | A | 7/1992 | Metcalfe |
| 5,178,539 | A | 1/1993 | Peltier et al. |
| 5,302,125 | A | 4/1994 | Kownacki et al. |
| 5,417,570 | A | 5/1995 | Zuest et al. |
| 5,564,922 | A | 10/1996 | Rosa et al. |
| 5,599,185 | A | 2/1997 | Greenberg |
| 6,287,115 | B1 | 9/2001 | Lustig et al. |
| 6,843,653 | B2 | 1/2005 | Carlton |
| 6,981,871 | B2 | 1/2006 | Mullaly et al. |
| 7,214,063 | B2 | 5/2007 | Cohen |
| 8,684,733 | B2 | 4/2014 | Mcbride et al. |
| 8,784,103 | B2 | 7/2014 | Studer et al. |
| 9,078,719 | B2 | 7/2015 | Mcbride et al. |
| 9,320,577 | B1 | 4/2016 | Alotaibi et al. |
| 9,452,029 | B2 | 9/2016 | Mullaly et al. |
| 9,452,030 | B2 | 9/2016 | Allen et al. |
| 9,474,587 | B2 | 10/2016 | Wang |
| 9,486,300 | B2 | 11/2016 | Mullaly et al. |
| 9,554,878 | B2 | 1/2017 | Benzon |
| 9,592,104 | B2 | 3/2017 | Mcbride et al. |
| 9,687,320 | B2 * | 6/2017 | Seavey ................ A61C 8/0054 |
| 9,827,074 | B2 | 11/2017 | Allen et al. |
| 9,931,181 | B2 | 4/2018 | Allen et al. |
| 10,130,447 | B2 | 11/2018 | Xam-Mar Mangrane |
| 10,213,279 | B2 | 2/2019 | Wang |
| 10,265,144 | B2 | 4/2019 | Mcbride et al. |
| 10,507,085 | B2 | 12/2019 | Elsner |
| 10,842,597 | B2 | 11/2020 | Allen et al. |
| 11,045,288 | B2 | 6/2021 | Xam-Mar Mangrane |
| 12,023,220 | B2 | 7/2024 | Kofford et al. |
| 2005/0042573 | A1 | 2/2005 | Lustig et al. |
| 2008/0261174 | A1 | 10/2008 | Gittleman |
| 2009/0246733 | A1 | 10/2009 | Auderset et al. |
| 2010/0151420 | A1 | 6/2010 | Ranck |
| 2010/0291507 | A1 | 11/2010 | Abdelgany |
| 2012/0315599 | A1 | 12/2012 | Mullaly |
| 2015/0313690 | A1 | 11/2015 | Elsner |
| 2016/0022387 | A1 | 1/2016 | Allen et al. |
| 2017/0049540 | A1 | 2/2017 | Mullaly |
| 2018/0140390 | A1 | 5/2018 | Elsner |
| 2018/0303586 | A1 | 10/2018 | Jacobsen et al. |
| 2019/0117345 | A1 | 4/2019 | Mcbride et al. |
| 2021/0038348 | A1 | 2/2021 | Allen et al. |
| 2021/0137649 | A1 | 5/2021 | Kirsch et al. |
| 2022/0117703 | A1 | 4/2022 | Gasparon et al. |
| 2022/0387144 | A1 | 12/2022 | Kofford et al. |
| 2024/0090982 | A1 | 3/2024 | Kofford et al. |

FOREIGN PATENT DOCUMENTS

| | | |
|---|---|---|
| CN | 105916466 B | 11/2018 |
| DE | 9202656 U1 | 4/1992 |
| DE | 19653229 A1 | 6/1998 |
| DE | 19959366 A1 | 6/2001 |
| DE | 10133932 A1 | 1/2003 |
| EP | 0288702 A2 | 11/1988 |
| EP | 0580945 A1 | 2/1994 |
| EP | 1547543 A1 | 6/2005 |
| EP | 2647347 A1 | 10/2013 |
| EP | 2594225 B1 | 7/2018 |
| EP | 3831335 A1 | 6/2021 |
| EP | 3981359 A1 | 4/2022 |
| FR | 2727307 A1 | 5/1996 |
| IT | UD20110065 A1 | 10/2012 |
| JP | 2551779 B2 | 11/1996 |
| JP | 2014516731 A | 7/2014 |
| KR | 101966407 B1 | 4/2019 |
| KR | 102034995 B1 | 10/2019 |
| WO | 9203984 A1 | 3/1992 |
| WO | 2014053850 A1 | 4/2014 |
| WO | 2016139671 A1 | 9/2016 |
| WO | 2018106027 A1 | 6/2018 |
| WO | 2020100106 A2 | 5/2020 |

OTHER PUBLICATIONS

Goodacre et al., "Prosthetic complications with implant prostheses (2001-2017)", European Journal of Oral Implantology; 2018; 11(suppl1):S27-36.

Hanif et al. Complications in implant dentistry, European Journal of Dentistry 2017; 11:135-40.

Hess et al., "A technique to guide replacement of multi-unit abutments supporting an existing implant-supported fixed complete denture"; Journal of Prosthetic Dentistry, 2020, 124:3, p. 270-273. USA.

Lee et al. "Accuracy of five implant impression technique: effect of splinting materials and methods", J Adv Prosthodont 2011; 3:177-85, Korea.

Omuri et al., "Biological and mechanical complications of angulated abutments connected to fixed dental prostheses: A systematic review with meta-analysis"; 2020; Journal of Oral Rehabilitation, 47(1):101-111 USA.

Sahin et al., The Significance Of Passive Framework Fit In Implant Prosthodontics: Current Status, Implant Dentistry /vol. 10, No. 2 2001, 85-90.

Siamos et al. The Relationship Between Implant Preload and Screw Loosening on Implant-Supported Prostheses, J. Oral Implantology, 2002, 67-73. http://meridian.allenpress.com/joi/article-pdf/28/2/67/2032852/1548-1336(2002) 028_0067_trbipa_2_3_co_2.pdf.

Supplementary European Search Report corresponding to European Patent Application No. 22816962.9 (4 pages) (dated Jan. 15, 2024).

Svoboda, Dental Implant Prosthetics: Using a Modified Installation Technique, Oct. 18, 2016, downloaded from https://www.oralhealthgroup.com/features/dental-implant-prosthetics-using-modified-installation-technique/ on Dec. 3, 2022.

Buzayan, et al., "Passive Fil in Screw Retained Multi-unit Implant Prosthesis Understanding and Achieving: A Review of the Literature", J Indian Prosthodonl Soc., 14(1):16-23 (Jan.-Mar. 2014).

Cavallaro, et al., "Angled implant abutments: A practical application of available knowledge", Journal of the American Dental Association, 142(2):150-158 (2011).

\* cited by examiner

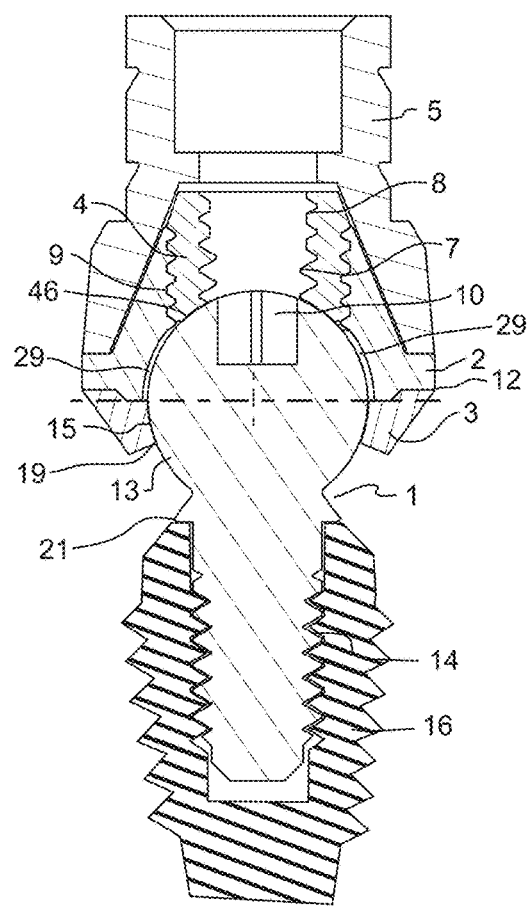
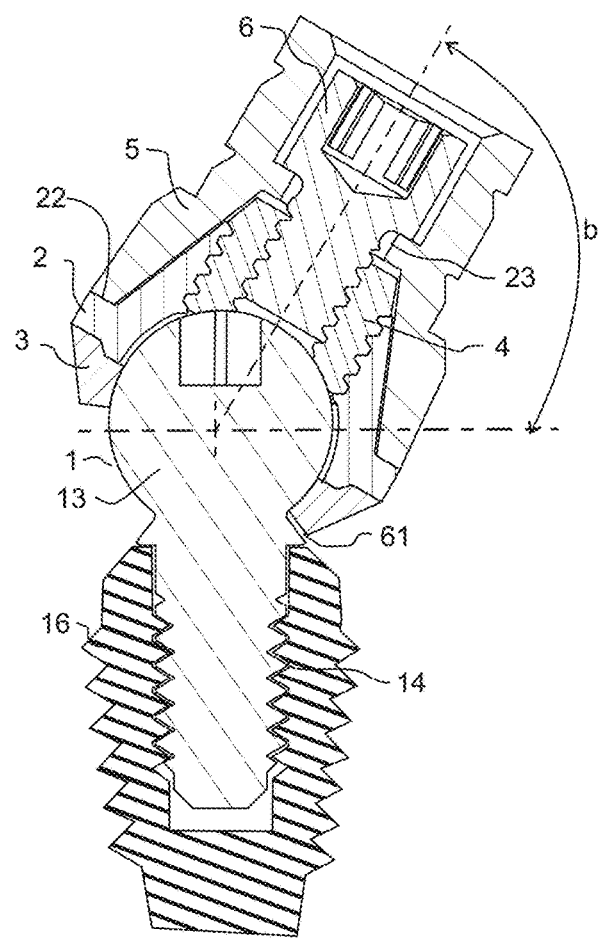
FIG. 3
FIG. 4

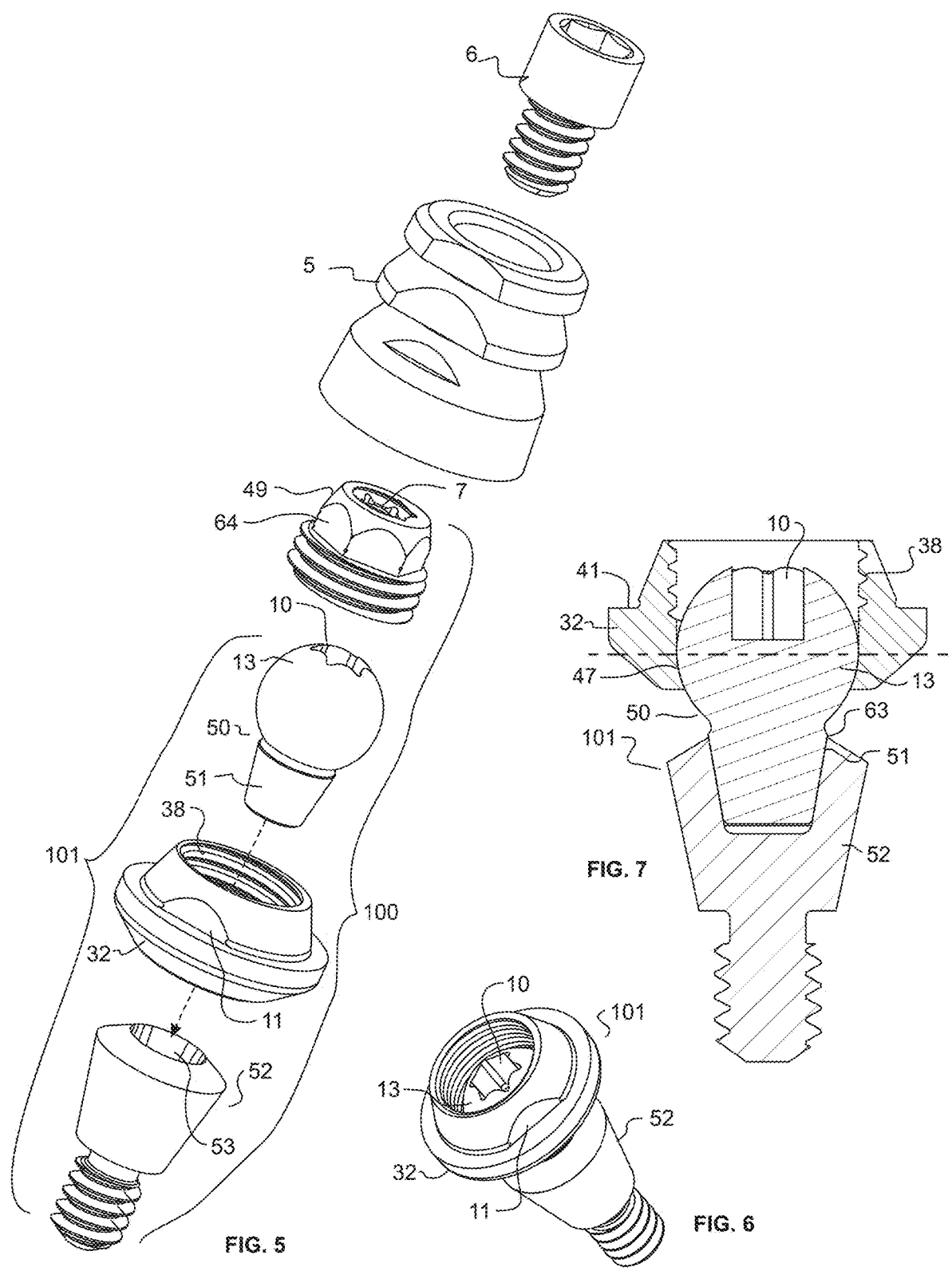

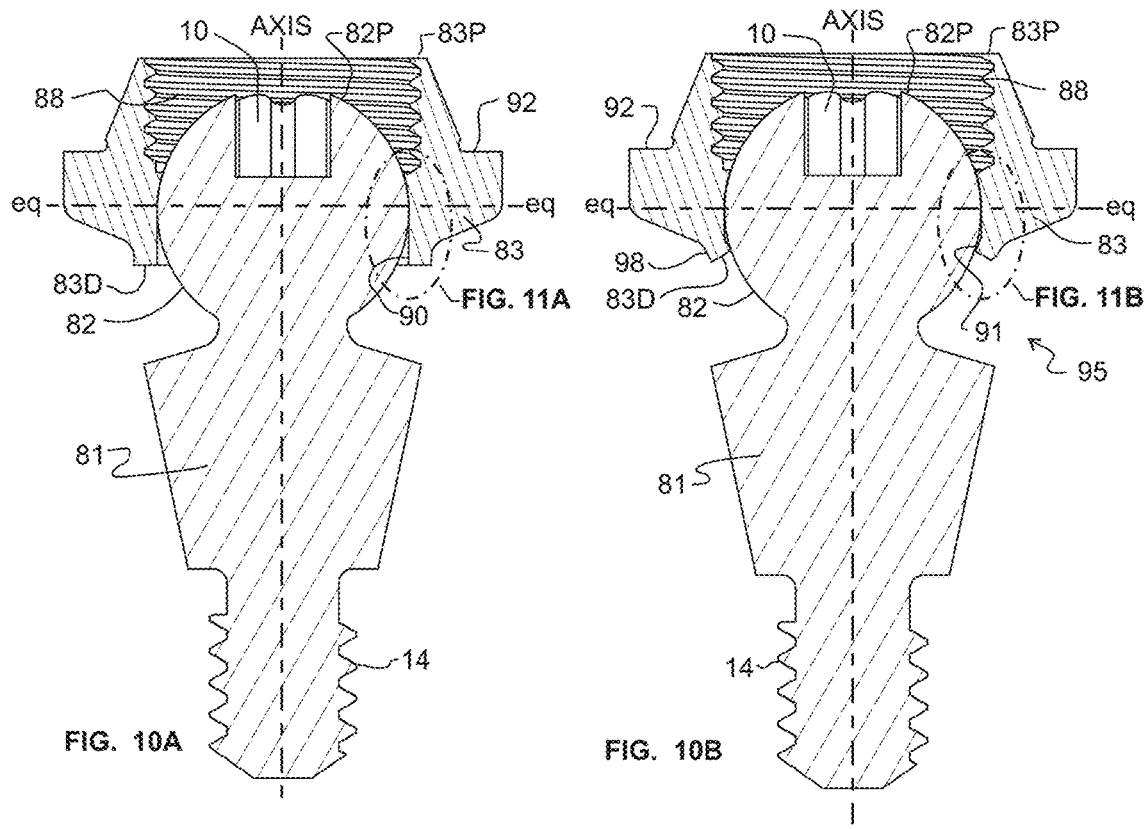
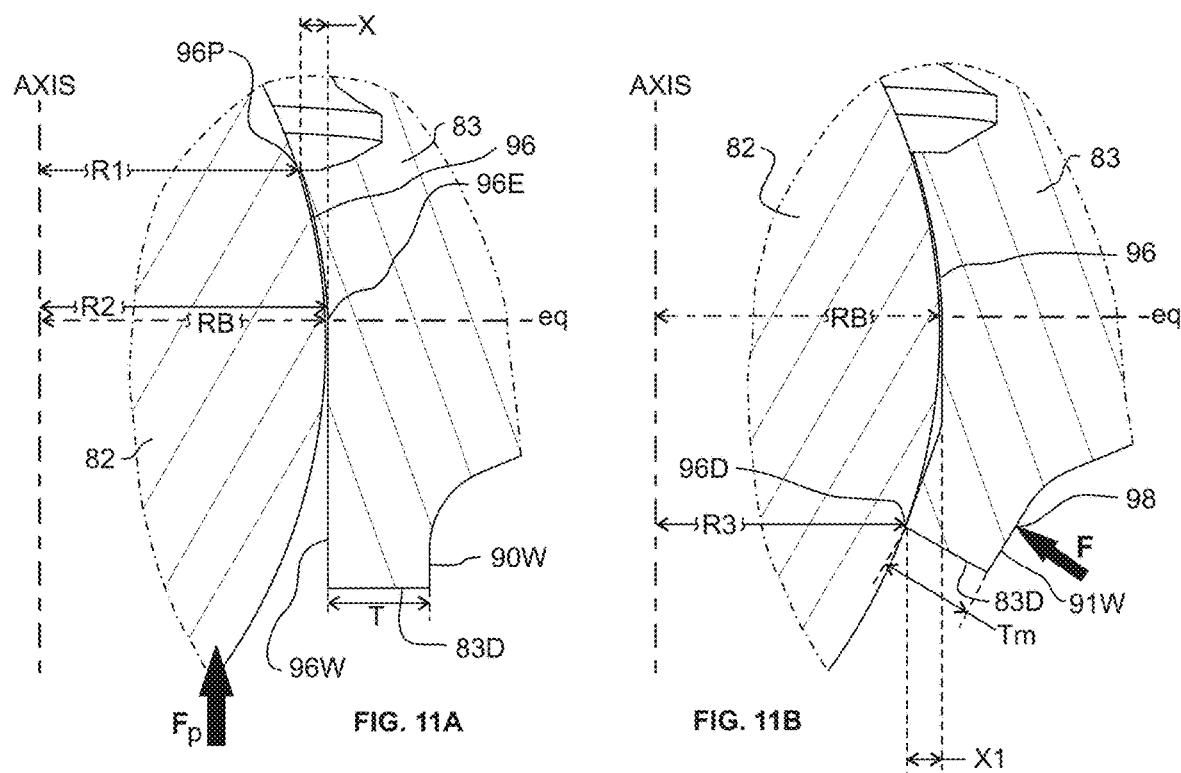

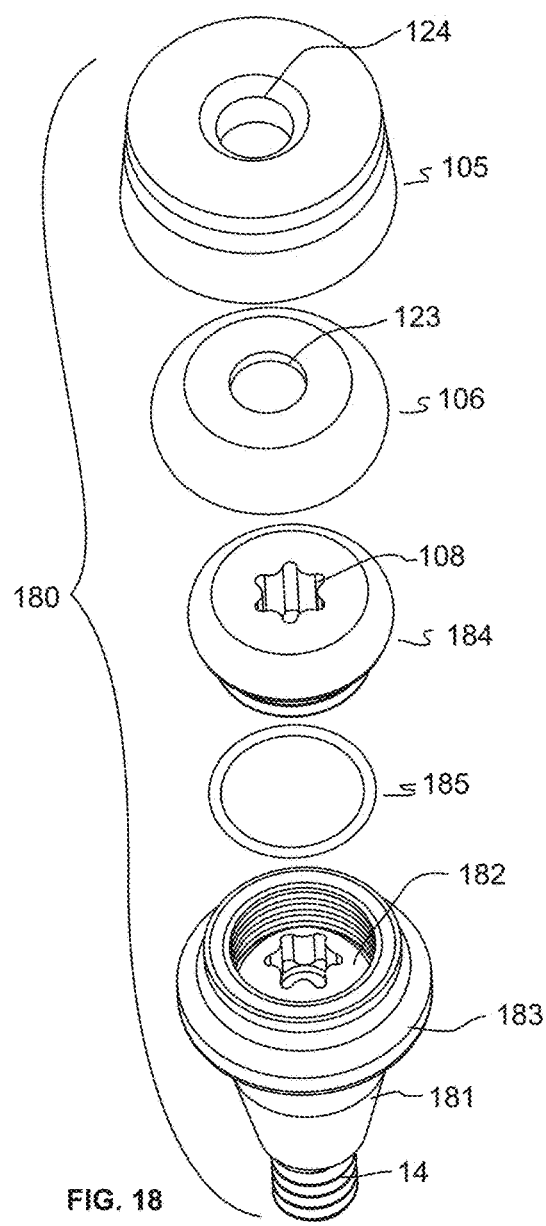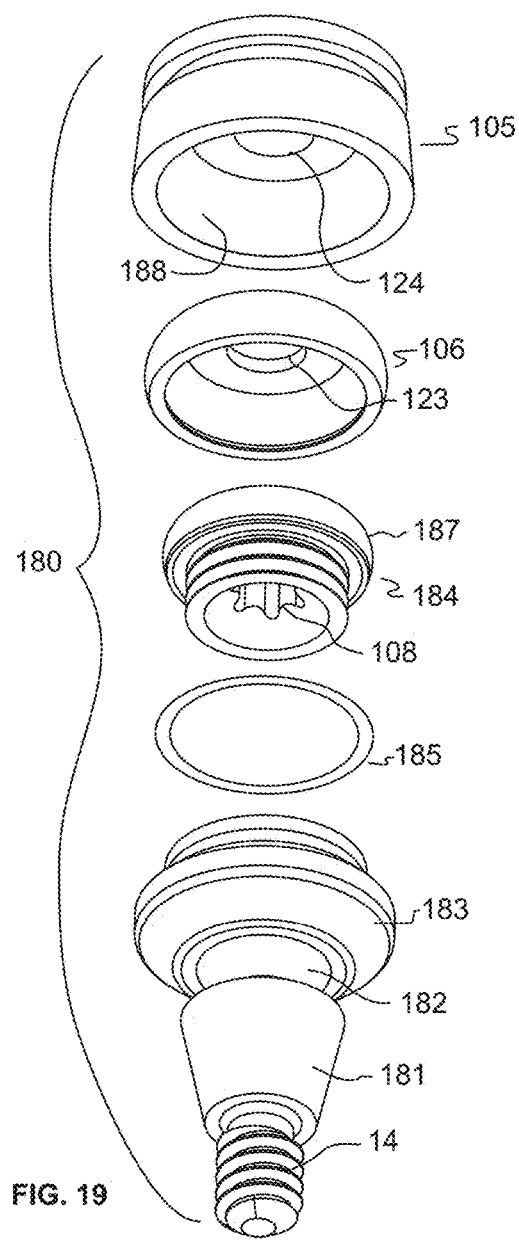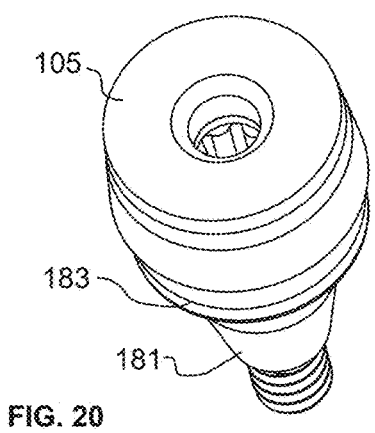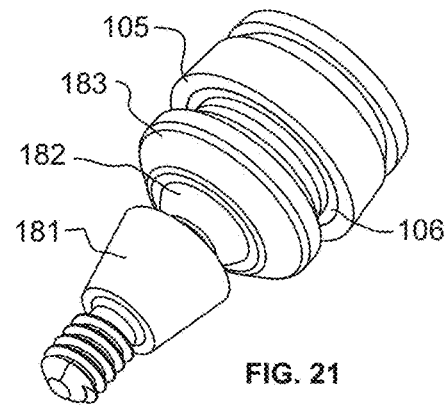

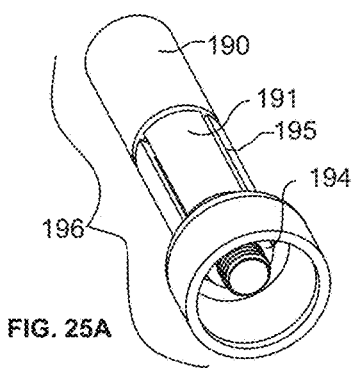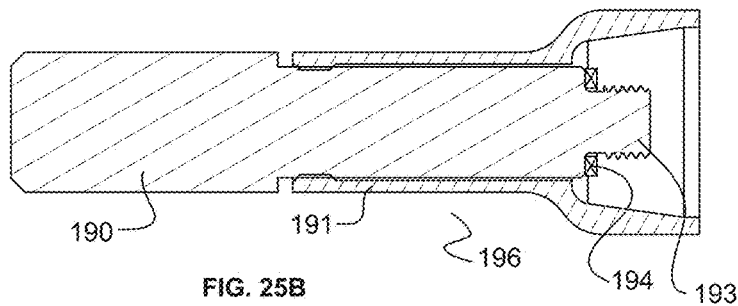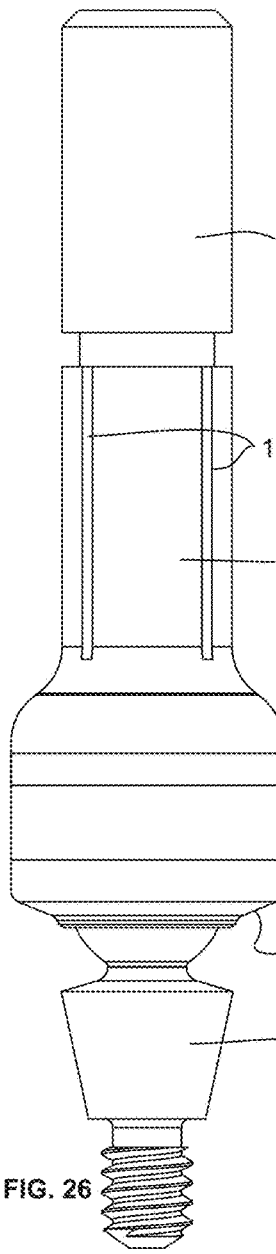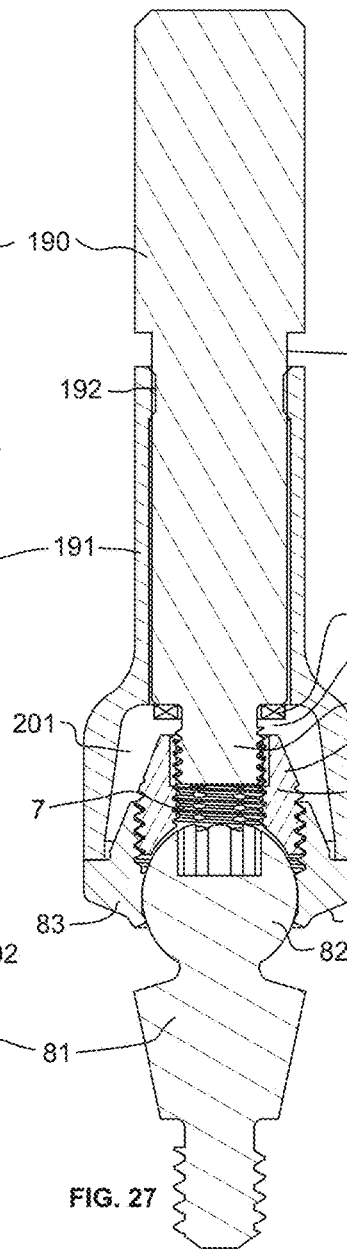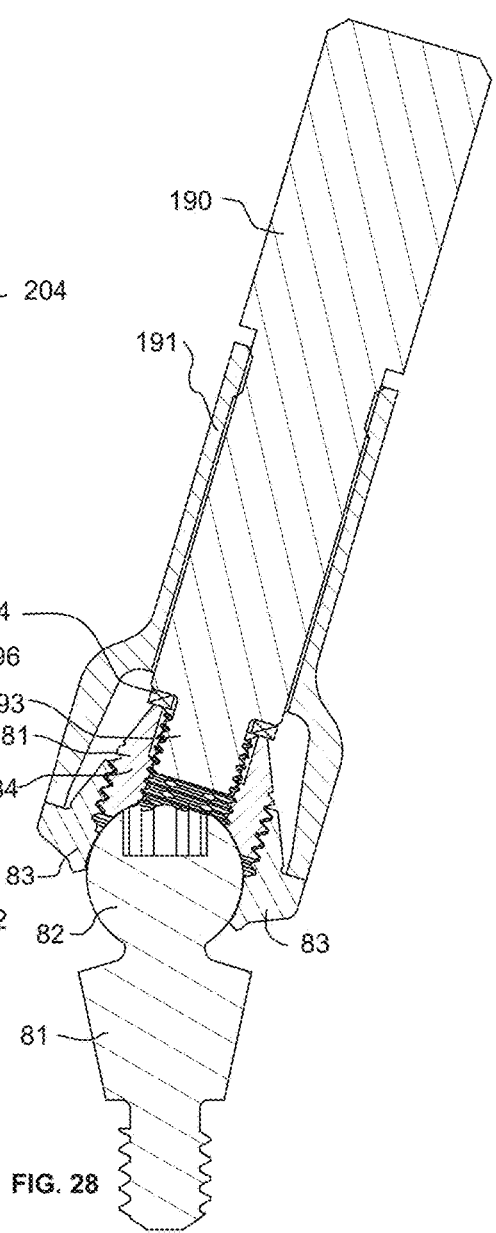

OMNI-DIRECTIONAL MULTI-UNIT ABUTMENT DENTAL SYSTEMS

REFERENCE TO RELATED APPLICATIONS

This patent application claims the benefit of and priority to U.S. Provisional Patent Application Ser. No. 63/509,529, filed on Jun. 22, 2023, and is a continuation-in-part of U.S. patent application Ser. No. 17/832,143, filed Jun. 3, 2022, which claims the benefit of and priority to U.S. Patent Application Ser. No. 63/196,227, filed Jun. 3, 2021, the contents of which are incorporated by reference as if recited in full herein.

FIELD OF THE INVENTION

The present invention relates to dental implant systems.

BACKGROUND

Different systems have been introduced for attaching dental prostheses to dental implants to replace one or more natural teeth. In order to simplify future modification or replacement needs, it is desirable to have reversable attachment between the implants and prostheses using mechanical systems as opposed to directly bonding these components together. These systems may include features to provide both proper alignment and retention for acceptable use by the patient. Intermediate components such as Ti bases (also called "copings") and separable abutments are often employed to provide proper registration between a dental prosthesis, one or more implants embedded in the patient's jawbone, and the soft-tissue and any remaining natural teeth. These intermediate elements may be mutually attached with screws, ball-and-socket joints, snap-on mounts, cement or other mechanical means.

The simplicity of screw-attached systems provides some benefits over snap-on systems beyond fabrication cost. The mounting pressure between the coping and abutment is readily controlled through the torque applied to the screw to tighten it. This axial tension control and the self-aligning characteristics of engaged screw threads provides more certainty in the engagement force and relative orientation of the components. Even if a screw breaks, techniques are known for removing the pieces without damage to surrounding components. Screws also have a benefit of independence for removal since each coping can be loosened individually. Tilting the prosthesis after screw removal to disengage one coping cannot cause reengagement of another coping. Potential damage to the prosthesis or the implant from the stresses of attaching and removing snap-on systems are also avoided. Unlike screw-attached systems, snap on systems do not require access holes to engage prosthetic screw heads and may accommodate some misalignment in parts through variable compression forces. As a result, both types of systems are expected to be used for the foreseeable future. Both systems benefit from having the best alignment between interfacing components.

In the case of a single-tooth crown attachment, the Ti base and abutment surfaces preferably include features to remove rotational symmetry about the azimuthal axis in the mating of the abutment and coping surfaces. Rotational locking features may also be included in these single mount systems. When the prosthesis contains multiple copings for attachment to multiple abutments, this rotational fixation is not generally required. For example, 30-degree tapered mating surfaces for multiple interface locations are sufficient to provide complete registration. This form is illustrated in the drawings of this disclosure for convenience but is not meant to be limiting. Although abutment elements and copings illustrated in the embodiments of this disclosure have axial symmetry, this is done for convenience. While such symmetry simplifies modelling of mechanical stresses, many inventive concepts disclosed can be applied to axially asymmetric systems. These are considered to be part of the scope of the inventive concepts.

The goal for all implant attached prostheses is to have a passive fit of the prosthesis superstructure to the implants to avoid stress on the prosthesis or on the osseointegration process of the implants. These stresses may cause problems during the initial loading or crop up much later. Misfit can lead to both mechanical and biological problems in single implant and multiple implant treatments. The mechanical problems may include loosening of prosthesis retaining and abutment screws and fracture of components including screws. Biological issues may include discomfort, progressive marginal bone loss, bacterial infection, microbial plaque buildup and implant loosening.

Having a passive fit initially or being able to readjust or rework components later to adapt to changes are important for successful prosthesis functionality and survival. Due to the build-up of tolerances and introduction of misalignments and distortions in producing a prosthesis, attaining a passive fit remains a challenge. The use of direct pick-up impression procedures is beneficial, but improvements are still needed. A review of passive fit challenges has been provided by Buzayan, M. M., & Yunus, N. B. (2014) "Passive Fit in Screw Retained Multi-unit Implant Prosthesis Understanding and Achieving: A Review of the Literature" Journal of Indian Prosthodontic Society, 14 (1), 16-23.

A treatment option for edentulous patients that is gaining popularity involves the placement of four to eight implants in the edentulous jaw and the mounting of a prothesis arch. A transmucosal abutment is fastened to the implant and intended to remain in place indefinitely. While it would be desirable to have the axes of all of the implants located parallel to one another, underlying bone structure often results in installing implants at an angle from this ideal mutual orientation. "Multi-unit abutment" is a popular descriptor for a specific type of transmucosal abutment used for the restoration of the edentulous jaw with a single prosthesis, that is a full arch prosthesis.

The multi-unit abutment (commonly referred to as an "MUA") is a fairly easy way to improve divergent angulations of implants with options of 0 degree, 17 degrees, and 30 degrees angulation corrections. Generally, 0-degree MUAs are easier to position because the abutment is positioned in line with the linear axis of the implant. The 17- and 30-degree MUAs typically include a "screw access" indicator that is relatively long and difficult to work around in tight spaces, such as the posterior of the jaw where these abutments are commonly positioned to compensate for the disto-angulation of the posterior implants popularized by Dr. Paolo Maolo in 2004.

There have been several alternative abutment designs for the restoration of the edentulous arch. Although most implant companies have settled on the MUA geometry adopted by Nobel Biocare, there have been some attempts to improve on the weaknesses of that geometry. For example, Dentsply Implants Astra EV system uses a "mulTi base" abutment that improves on the lack of coverage of the prosthetic screw in the multi-unit abutment. Neoss uses a version of the MUA that "reduces the height of the abutment" by using a female connection as opposed to the standard male connection of the MUA. Regardless of the benefits of these improved designs, each design requires the clinician to order a specific stock of specific angulation corrections and heights. An example of the complexity of the inventory management is when the implant system offers multiple implant/abutment connections (e.g., narrow platform and regular platform) and multiple heights to the MUAs (e.g., 1.5 mm, 2.5 mm, 3.5 mm, 4.5 mm, etc.) as well as different angulations or tilt angles (e.g., 0 degree, 17 degrees, and 30 degrees). To maintain sufficient stock to be well-prepared for a full arch implant fixed immediate load procedure could require having the three tilt angle options multiplied by the number of platform options multiplied by the number of reasonable tissue heights for the amount of implants expected to be placed (a minimum of four according to Paolo Maolo's protocol).

The resulting inventory equation follows:

3 (degree options) × 2 (platform connections) × 2

(different tissue heights) × (implants) = 48 (multi – unit abutments).

This inventory problem is increased when multi-unit abutment systems also require unique implants, Ti bases and prosthetic fasteners. This inventory management complexity is further exacerbated when practitioners prefer different vendor systems under different patient circumstances, or when different practitioners in a practice prefer different vendor offerings.

In addition to the complexity of the inventory management, there is also a limitation to the discrete nature of the "angulation correction" (for example, limited to three specific angles 0, 17 and 30 degrees) and the internal connection of the implant about its longitudinal axis that may be referred to as an azimuthal angle. In many cases an internal hex limits the possibilities to 6 azimuth positions with 60 degrees of variation from one position to the next. In some cases, 0 degrees would be too little tilt angle correction, but 17 degrees is excessive. The same would hold true for 17 to 30. Or 17 degrees may be an appropriate tilt correction, but due to the limitation of the 6 positions in the internal hex, the 17 degrees of correction required cannot be applied in the ideal azimuthal direction of correction needed. The same holds true for 30-degree correction. Novice clinicians to full arch implant treatment struggle with the selection and positioning of multi-unit abutments. Procedure times are extended which can cause increased morbidity for the patient.

A 2020 paper by Omori et al. titled "Biological and mechanical complications of angulated abutments connected to fixed dental prostheses: A systematic review with meta-analysis" (Journal of Oral Rehabilitation, 47 (1): 101-111) finds a statistically significant increase in marginal bone loss with angled abutments but does not claim this is clinically significant. Mechanical problems especially with screw loosening and other mechanical effects are found in both angulated and straight abutments. Although there is uncertainty over whether angled implants are more susceptible to loss of osseointegration than straight abutments, all implants do impart higher mechanical stress and strain on bone structures than natural teeth. Natural teeth can move an order of magnitude more in their sockets than an implant embedded in bone. This natural shock absorber helps cushion the range of force magnitudes and directions applied to the teeth from the bone. Screw loosening has been associated with bending of the screw joint and settling effects in which initial surface microroughness keeps joined parts initially separated, but high spots are gradually worn down. Microgaps from initial mechanical misfit between elements in the prosthesis superstructure may be too small for detecting with an explorer, yet large enough to concentrate mechanical forces coming from different directions at different magnitudes in the process of mastication. These microgaps may still be large compared to bacteria that can penetrate and grow in internal cavities of the overall dental prosthesis superstructure installation.

Due to the large range of variables, application specifics and difficulty of in situ measurements, there is not an accepted passive fit threshold for long-term success. The quality of fit may be tested in the dental laboratory with analogs and at installation in the patient, but this is not an exacting science. For example, a "one screw test" for fit involves tightening only one screw at one end of the prosthesis and then looking for lift at the opposing end. A "screw resistance test" variant of this involves inserting and seating screws in sequence and then seeing if any needs to be turned more than 180 degrees to achieve say 10 N-cm of torque. Failure of the prescribed go-no go test criterion means that the prosthesis needs to be reworked or replaced. Since the same process will be used to fabricate the replacement, there is no certainty that this replacement will be properly aligned.

Even if all of the multi-unit abutments are perfectly aligned and secured initially with the implants and prosthesis, changes may occur over time. For example, the prothesis may deform, or the bone structure may change, or perhaps more likely a fastener becomes loose or breaks. An updated compilation of reported failures has been provided by Goodacre et al. in "Prosthetic complications with implant prostheses (2001-2017)" (European J Oral Implantology 2018; 11 Suppl 1:S27-S36.) In many prior art systems, the prosthesis must be completely removed to try to adjust the orientation, retighten a multi-unit abutment fastener, replace a component or perhaps even fabricate and fit a whole new prosthesis. Inefficient trial and error fitting cycles to improve alignment are frustrating to both the patient and dental practitioner. Replacing a single failed multi-unit abutment out of several and properly aligning it with an existing prosthesis may be even more difficult than the initial installation alignment. For example, a recent paper (Hess T A, Ramos V Jr, Buglione D. "A technique to guide replacement of multiunit abutments supporting an existing implant-supported fixed complete denture" J Prosthetic Dentistry, 2020 September; 124 (3): 270-273) describes the difficulty in replacing one angulated multi-unit abutment of a system at the proper orientation. The process includes fabricating a specialized tool using a definitive cast with abutment analogs that attaches to an adjacent abutment. It is also reported that the impression techniques used materially affect the accuracy of definitive casts and that deformation forces and resulting distortions increase with implant angulation. For example, see Elshenawy et al., "Cast accuracy obtained from different impression techniques at different implant angulations (in vitro study)" International J of Implant Dentistry 4, 9 (2018) and Lee et al. "Accuracy of five implant impression technique: effect of splinting materials and methods", J Advanced Prosthodontics 2011; 3:177-85. There is a general need for improved passive fit of implant supported protheses. There is a need for a way to provide adjustments to the orientation of a multi-unit abutment orientation while the prosthesis is in place not just in the repair or readjustment of complications, but also in the initial mounting to help compensate for prostheses fabrication errors.

Some commercial systems require the sequential assembly of the multi-unit abutment elements in situ during their installation in the patient's mouth. This increases the chance of the patient accidentally swallowing components. Each additional mechanical joint increases the possibility of bacterial passage through microgaps. Some systems require multiple tools to be employed which can also extend procedure complexity and times.

One benefit of snap-on systems is that the compressible liner that provides the reversible retention capability can accommodate some angular misalignment between implant abutments. The snap-on systems generally include an implant abutment and a snap-on coping that includes a rigid cap and a compressible retention liner or insert. The cap typically will include exterior surface structures to improve bonding to a prosthesis and an interior structure to hold the compressible retention insert inside the cap. The compressible retention insert generally includes some mechanical profile on its interior that engages a complimentary profile on the implant abutment. The compressible retention insert or liner is compressed between the abutment and cap to provide the snap-on coupling. The geometry and material properties of the liner may be chosen to provide different degrees of retention depending upon the degree of angular misalignment between multiple abutments or how often or how easily the prothesis is expected to be removed. More recently, retention liners have become commercially available with higher retention capabilities that are designed to be as permanent as screw-attached prostheses. Like screw-attached prostheses, these systems require dental professionals and specialized tools for attachment and removal.

Although the retention inserts accommodate some degree of misalignment, misalignment of abutments and resulting asymmetric forces may increase stress on the implant abutment attachment to the implant, the prosthesis and or the patient's jaw. As a result, improved passive fit of the prosthesis to the implant abutment system is desirable in these systems as well. The inventory equation with fixed angle abutments noted above still applies when angled snap-on abutments are used to reduce the potential for damage or difficulty in mounting or removing prostheses. The consumable nature of the additional assortment of relatively inexpensive retention liners adds a minor additional negative impact.

Embodiments of omnidirectional multi-unit abutments are disclosed herein that have advantages in one or more of system cost, case of assembly and use, fewer mechanical joints, functional consistency or other issues found in existing multi-unit abutment systems for single implant crowns and multiple implant prostheses.

SUMMARY

Embodiments of the present disclosure provide a lower assembly of an omnidirectional multi-unit abutment having a swivel shell and abutment base for prosthetic screw attachment formed of only two pieces. The lower assembly of the multi-unit abutment employs a one-piece swivel shell that provides all the ball contact surfaces and that is locally deformed to capture the ball portion of a one-piece abutment base. This allows some orientation fixing capability and scaling without axial movement and without tightening a lock screw.

Embodiments of the present disclosure provide a system for alignment and attachment of a dental prosthesis to an implant. The system includes: an abutment base having a longitudinal axis, the abutment base that includes a proximal end portion with a ball with an abutment base drive interface and a distal end with screw threads for attachment to the implant. The ball has an equator (the equator being perpendicular to the longitudinal axis). The system also includes a swivel shell having a proximal end portion and an opposing distal end portion, an inner surface, an outer surface and a longitudinal axis. The swivel shell further includes an open internal channel extending along the longitudinal axis between the proximal end portion and the distal end portion. The open internal channel has threads. The swivel shell has an interference fit against the ball and contacts the ball at or above the equator of the ball and below the equator of the ball when the longitudinal axis of the abutment base is aligned with the longitudinal axis of the swivel shell whereby the swivel shell is able to tilt and rotate in response to forces applied to the swivel shell above a defined force. The system also includes a lock screw having a longitudinal axis. The lock screw includes a portion with external threads. The external threads threadably engage the threads of the open internal channel of the swivel shell. The lock screw also has an open internal channel that extends along the longitudinal axis of the lock screw.

The swivel shell is configured to press against the ball with sufficient force to retain a desired orientation without the lock screw in position.

The swivel shell can have a deformable wall at a distal end portion thereof so that the deformable wall is configured to have a first configuration for assembly to the ball that deforms to a second configuration to capture the ball in the swivel shell whereby the swivel shell contacts the ball above and below the equator of the ball when the when the longitudinal axis of the abutment base is aligned with the longitudinal axis of the swivel shell.

The swivel shell can have a single piece monolithic metal body providing all ball contact surfaces. In the second configuration, the swivel shell can have a minimum wall thickness at the distal end portion that is in a range of about 0.1 mm to about 0.25 mm.

The system can also include a dental coping. A portion of the lock screw can extend outside the swivel shell a distance in a direction proximal to the swivel shell. The dental coping can be sized and configured to enclose the portion of the lock screw that extends outside the swivel shell and part of the swivel shell.

The swivel shell can be configured to tilt and/or rotate relative to the ball when an applied torque of above 1.5 N-cm is applied thereto.

The inner surface of the swivel shell can define a contact surface(s) with the ball that, when viewed from a side, is in a range of about 10 degrees to about 45 degrees on both sides of the equator.

The swivel shell can be configured to frictionally engage the ball with sufficient retention force to prevent axial movement relative to the longitudinal axis of the abutment base. The swivel shell can be configured to capture the ball prior to assembly with the lock screw as a result of upper and lower hemisphere forces on the ball in the second configuration whereby a swivel shell minimum retention force is factory preset independent of the lock screw for field installation with the lock screw.

The open channel of the lock screw can have threads sized and configured to engage a prosthetic screw. The system can further include the prosthetic screw. The prosthetic screw threadably engages the threads of the open channel of the lock screw while the lock screw is threadably engaged to the threads of the swivel shell.

The distal end of the prosthetic screw can terminate at a location spaced apart from the ball inside the swivel shell.

The open channel of the lock screw can be devoid of screw threads. The system can further include a snap-on cap that is sized and configured to engage the proximal end portion of the swivel shell to attach the dental prosthesis to the abutment base. The snap on cap can be affixed to a Ti base coupled to an internal side of the dental prosthesis.

The system can include a snap-on cap that is sized and configured to engage the proximal end portion of the swivel shell. At least some of the proximal end portion of the swivel shell can reside inside the snap-on cap.

The lock screw can be configured to be rotatable to tighten against the ball and can cooperate with the swivel shell whereby the swivel shell alone provides a holding force against the ball to be at a desired angle relative to the ball without the lock screw and the lock screw increases a holding force against the ball. The swivel shell can hold the ball with sufficient force to allow the lock screw to be tightened in the swivel shell when the abutment base is attached to an implant to affix an orientation of the longitudinal axis of the swivel shell that is not parallel to the longitudinal axis of the abutment base.

The distal end portion of the swivel shell can be rotary swaged to capture the ball while applying an axial load to the swivel shell with the ball held in the swivel shell to form the second configuration whereby the swivel shell captures the ball by deforming the distal end of the swivel shell.

The system can include a Ti base. The Ti base can have an aperture on a proximal end that is larger than a shaft of a prosthetic screw and smaller than a head of the prosthetic screw. The Ti base can have a distal end that is shaped to reside against a seating surface in the outer surface of the swivel shell.

The system can also include n abutment base drive tool with a tip end portion that is sized to pass through the lock screw.

The system can also include a Ti base. The Ti base can have an aperture on the proximal end that is larger than a shaft of a prosthetic screw and smaller than a head of the prosthetic screw. An installation orientation of the swivel shell can be selectively made by tilting a lock screw drive tool away from the longitudinal axis of the abutment base and tightening the lock screw to a defined torque or a to a torque within a defined torque range. The lock screw drive tool can be sized to pass through the aperture of the Ti base without interference.

Other embodiments of the present disclosure are directed to a system for alignment and attachment of a dental prosthesis to a dental implant. The system includes a base having an abutment drive interface for screw attachment to the dental implant. The base includes a first end having a ball and a second end with a post with a longitudinal axis. The post is configured to threadably engage the dental implant. The system also includes a swivel shell with a longitudinal axis and an open channel with internal threads and a lock screw with external threads threadably engaged to the internal threads of the swivel shell. The ball is captured inside the open channel of the swivel shell with the post extending distal of the open channel. The system also includes one or more drive tools configured to engage the abutment drive interface and/or the lock screw. The swivel shell is sized and configured to hold itself against the ball though out advancement of the lock screw to an installation position in the swivel shell and the lock screw is configured to rotatably advance in the swivel shell to increase pressure on the ball above that provided by the swivel shell alone to initially fix orientation of the swivel shell relative to the ball.

A portion of the lock screw can extend external of the swivel shell in a proximal direction.

The swivel shell can have a deformable wall at a distal end portion thereof so that the deformable wall is configured to have a first configuration for assembly to the ball that deforms to a second configuration to capture the ball in the swivel shell, and the swivel shell can provide contact forces against the ball above and below an equator of the ball when the longitudinal axis of the swivel shell and the longitudinal axis of the post are aligned.

The swivel shell can have a single piece monolithic metal body and, in the second configuration, the swivel shell can have a minimum wall thickness at the distal end portion that is at least about 0.1 mm.

The system can further include a dental coping. The dental coping can be sized and configured to enclose the lock screw and part of the swivel shell. The dental coping can have a mounting interface a distal end thereof configured to mount on a seating surface on the exterior surface of the swivel shell. The one or more drive tools is/are capable of being inserted through an aperture in the dental coping to engage the lock screw.

The lock screw can have a proximal end portion configured to engage a snap-on coping, and the snap-on coping can include a compressible structure.

A force applied in a distal direction to the dental prosthesis containing an embedded coping can result in a force applied to an interface with the swivel shell sufficient to change an orientation of the swivel shell relative to the ball.

The system can further include a coping with a tapered outer surface. The force applied in the distal direction can be applied to the tapered outer surface, which then applies the force to the swivel shell to change the orientation of the swivel shell relative to the ball.

The coping can have a coping aperture and the lock screw can have a lock screw drive interface located in the open channel matable to a drive tool provided as one of the one or more drive tools. The drive tool is insertable through the coping aperture to engage the lock screw drive interface.

Yet other embodiments are directed to a system for alignment and attachment of a dental prosthesis to a dental implant that includes: an abutment base having a longitudinal axis, the abutment base including a proximal end portion with a ball with an abutment base drive interface and a distal end with screw threads for attachment to the implant. The ball can have or define an equator. The system also includes a swivel shell with a proximal end portion and an opposing distal end portion, an inner surface, an outer surface and a longitudinal axis. The swivel shell can also have an open internal channel extending along the longitudinal axis between the proximal end portion and the distal end portion. The open internal channel has threads sized and configured to engage external threads of a lock screw. The swivel shell slidably holds the ball and contacts the ball above and below the equator of the ball when the longitudinal axis of the abutment base is aligned with the longitudinal axis of the swivel shell. The swivel shell is configured to capture the ball to prevent axial movement relative to the longitudinal axis of the abutment base and provide a desired tilt orientation in a range of about 0 degrees to about 30 degrees. The swivel shell captures the ball prior to assembly with a lock screw as a result of upper and lower hemisphere forces on the ball whereby a swivel shell minimum retention force is factory preset independent of the lock screw for field installation with the lock screw.

The swivel shell can have a distal end wall segment that inelastically deforms to contact the ball thereat thereby forming a seal.

The distal end wall segment can seal against the ball.

Some embodiments of the invention include a multi-unit abutment for screw attachment to a dental implant which allows seating of Ti bases at a user-selected rotation and tilt angle relative to the implant. This seating orientation can be fixed prior to bonding the Ti base to the prosthesis, and in some embodiments can be adjusted or tightened by removing the prothesis retention screw while the Ti base is otherwise held onto the abutment. In this manner, the final relative orientation of the adjustable abutment can be directly influenced by the fixed position of the Ti bases in the prosthesis. This can correct or reduce misalignments resulting from the accumulation of positioning errors in steps of the fabrication of the prosthesis relative to the initial position of the abutments.

Some embodiments of the invention include a multi-unit abutment that is assembled outside of the patient's mouth, mounted onto a drive tool in a linear arrangement for attaching it to an implant, reorienting the abutment portion that interfaces with a Ti base that is not aligned with the axis of the implant, and then fixing the orientation to a desired force resistance. Subsequently a Ti base can be attached to the multi-unit abutment with a prosthetic screw.

Some embodiments of the invention allow a single drive tool to screw the multi-unit abutment into an implant and to lock the orientation of the abutment surface. Other embodiments use different drive tools for these processes.

Some embodiments of the invention include a ball portion and a swivel portion that are capable of relative tilt or rotation but are constrained to not separate from one another. Some embodiments allow the relative orientation of the ball and swivel to be fixed by applying pressure on opposite sides of the ball portion equator in the absence of a lock screw. Some embodiments of the invention include a locking screw attached to a swivel portion to apply pressure on diametrically opposite sides of the ball. Some embodiments maintain pressure on opposite sides of the ball in the absence of a locking screw. In some embodiments, the multi-unit abutment can be installed in the implant by passing a drive tool through an aperture of the locking screw. In some embodiments of the invention, the locking screw includes threads for the prosthetic screw. In some embodiments, the locking screw can be accessed through the Ti base fixed to a prosthesis.

Although screw attachment of the prosthesis is preferred, some embodiments of the invention provide a multi-unit abutment with angular adjustment capability that uses a snap-on coupling as an alternative to a prosthetic screw.

One embodiment describes a system for alignment and attachment of a dental prosthesis to an implant with a prosthetic screw, wherein the prosthetic screw comprises a head and a threaded shaft, the system including: an abutment base having a longitudinal axis, the abutment base having a proximal end comprising a ball portion and an abutment base drive interface and a distal end with screw threads for attachment to the implant; and a swivel shell having an inner surface and an outer surface. The swivel shell includes a swivel aperture proximate the distal end and a threaded aperture at the proximal end. The system also includes a lock screw having a longitudinal axis. The lock screw includes a portion with external threads compatible with the threaded aperture of the swivel shell, a portion with internal threads sized to engage the prosthetic screw shaft, and a lock screw drive interface. Rotating the lock screw is capable of fixing the orientation of the longitudinal axis of the lock screw in an orientation that is not parallel to the longitudinal axis of the abutment base.

Embodiments of the present disclosure provide a swivel shell that has a portion that is deformable onto the ball, optionally with rotary swaging, to capture the swivel shell, provide a higher contact area with the ball and to provide pressure on the ball from both sides of the equator provided by the swivel shell to hold the swivel shell in position without tightening a lock screw to limit axial movement and/or hold a relative tilt angle.

One embodiment describes a fabrication method of an omnidirectional multi-unit abutment that includes: inserting the ball portion of an abutment base inside a swivel shell, applying axial pressure to the ball to force its proximal side into intimate contact with the interior of the swivel shell; and deforming the opening of the swivel shell to capture the swivel shell on the ball portion.

The deforming can be performed using a rotary swaging process that can incorporate inelastic deformation of the swivel shell to reduce the aperture at the distal end of the swivel shell and force the swivel shell against the ball. The interference fit of the swivel shell with the ball provides a static frictional force that maintains the relative orientation of the two parts without tightening the locking screw. This frictional force can be overcome with a slip torque above a design threshold determined by material selection, geometry, surface finish and rotary swaging process variables. For example, maintaining a minimum wall thickness at the distal aperture of the swivel shell after reducing the aperture with rotary swaging is necessary to maintain consistent reorientation resistance. This also improves the sealing of the swivel shell to the ball in this area during installation in a patient's mouth.

Some embodiments describe a system for alignment and attachment of a dental prosthesis to an implant using a multi-unit implant abutment, the multi-unit implant abutment including: a ball and shell assembly with a base comprising an abutment drive interface for screw attachment to the implant. The base has a first end having a ball and a second end with a threaded post with a longitudinal axis. The threaded post is designed to screw into a dental implant to a predetermined torque. The ball and shell assembly also has a shell portion having an interior surface and an exterior surface. The shell portion has a first end with an aperture and a second end has a lock screw. The ball is captured inside the shell portion using metal forming, optionally rotary swaging, proximate the aperture of the shell portion with the threaded portion of the base post extending through the aperture. The system also includes a Ti base with an aperture on the proximal end and an interface on the distal end designed to mount on the exterior of the shell portion in a known position; and one or more drive tools designed to engage the abutment drive interface and the lock screw. At least one drive tool is capable of being inserted through the Ti base aperture to engage the lock screw. Tightening the lock screw applies additional pressure on the ball, above that applied by the shell portion, to fix the orientation of the shell relative to the ball.

Some embodiments of the invention describe a multi-unit implant abutment system for alignment and attachment of a dental coping to a dental implant, the multi-unit implant abutment including: a ball and shell assembly having a base with a proximal end comprising a ball portion and an abutment drive interface for rotating the base for screw attachment to the implant, and a distal end comprising a threaded portion for mating with threads of the implant, and having a shell with a distal portion including a distal shell aperture. The distal shell aperture is sized and shaped around the ball portion to prevent passage of the ball portion of the base through the distal shell aperture. The shell has a proximal portion with a lock screw in threaded engagement with the proximal portion of the shell. Tightening the lock screw holds the shell in a desired orientation on the base independently of the screw attachment of the base to the implant. The lock screw includes an aperture with a mechanical interface for guiding the coping into a desired seating position on the shell; and attachment interface for reversibly holding the coping onto the shell. The abutment drive interface is accessible to a drive tool inserted through the aperture of the lock screw.

Some embodiments include fine tuning of the alignment of an abutment to the copings of the prosthesis by adjusting the multi-unit abutment through an aperture in the prosthesis and coping. In the case of screw-attached prostheses, the prosthesis may be manually pushed down on the abutments that are not fully fixed in position to direct them into more passive seating before setting the orientation and inserting a prosthetic screw. In the case of snap-on systems, the prosthesis may be used without compressive fixing to reorient the abutments using a coping with either a zero-retention processing insert or without any retention insert applied. If the snap-on coping, final retention insert and prosthesis have apertures, the prosthesis may be fully retained on the abutment when the abutments are not fully fixed in position. In this case, the localized compressive forces on each abutment of a system will naturally redistribute without external/intentional human intervention above a predetermined force threshold. After the final coping is snapped into position, the force-redistributed multi-unit abutment orientations can be fixed in position by tightening the lock screws through the apertures.

For the purposes of this disclosure, a dental prosthesis is defined broadly to be anything that incorporates one or more dental copings or Ti bases that can be mounted and removed from one or more implant abutments. Different Ti base designs are known in the dental industry, and the systems and methods disclosed here can be adapted to work with many commercially available types of Ti bases including pick-up copings, temporary cylinders, inserts and impression copings. Implant abutments are known in the dental industry having compatible interfaces to these Ti bases. Since the mechanical interface is the same, for the purposes of this disclosure, "implant abutment" is considered a generic term that includes abutment analogs. Descriptions of abutment alignment systems and process methods with Ti bases and implants that are installed in a patient's jaw should be considered to also describe equivalent inventive concepts that may be used with Ti bases and implant analogs in a dental lab. A common geometry comprises a conical Ti base seated to a conical implant abutment. Although this form of system is used in the figures and discussion below, the inventive concepts may also be applied to other types of Ti bases and abutments. The inventive concepts are not limited to Ti bases or copings that are attached to abutments with prosthetic screws. Features may also be applied to various snap-on systems, including those that include a coping with a deformable retention insert that is reversibly retained by compressive forces on a multi-unit abutment. This type will be discussed, but the inventive concepts can be adapted to other snap-on systems that do not include discrete retention inserts. For the purposes of this disclosure, the terms coping and Ti base are used generally and interchangeably for all of these structures that are used to align and seat prostheses with implant abutments.

The inventive concepts disclosed herein can be used with different types of dental prostheses. The dental prosthesis can be any form of impression used in a dental lab to assist in creating and testing dental prostheses. A dental prosthesis can also be one fabricated in the dental lab using a physical model made from the impression, a dental prosthesis newly fabricated, or an existing prosthesis being converted for screw or snap-on attachment. A dental prosthesis is defined to include a single-tooth appliance such as a crown, or any multiple-tooth bridge or denture. These prostheses may incorporate copings or Ti bases to provide a separable interface to provide orientation with an appropriate abutment attached to a patient's jaw or gingiva. Although the name implies applications with multiple implants, multi-unit abutments may also be used individually to provide mounting to an implant for single tooth prostheses. As a result, the term "multi-unit abutment" will be used herein whether for single implant or multiple implant applications and for any form of dental prosthesis. The multi-unit abutments for use with the inventive concepts disclosed herein may include screw threads to mount the prosthesis with Ti bases onto the abutments and the abutments into the implants. While the concepts describe the typical male threads in the multi-unit abutment mating with female threads on the implant, this is for convenience in disclosure. Unless explicitly stated or restricted by functional necessity, some inventive concepts may be applied with systems having female threads in the multi-unit abutment engaging a screw with male threads in an implant. These are considered to be straightforward variations of the inventive concepts. One benefit of preferring the typical female threading of the implant for abutment attachment is standardization and implementation flexibility. For the same reasons, prosthetic screws with male threads and commercially available Ti bases are preferred but may not be required to gain some benefit from inventive concepts disclosed. These types of variations are considered to be within the scope of this disclosure.

The systems and methods disclosed herein can be used with prostheses for attachment to implants in both the upper and lower jaw. As a result, portions of the system that are oriented downward for the lower jaw will be oriented upward for the upper jaw and vice versa. For convenience, a disclosure of an embodiment of inventive concepts that is limited to a single jaw orientation, is considered to disclose an embodiment for the opposite jaw orientation. When referring to the perspective of a clinician, proximal portions are nearer to the clinician than distal portions. While a term such as top is the opposite of the term bottom, and proximal is the opposite of distal, their actual relative orientation will be determined by the context of their use. The term tissue-side is used interchangeably with intaglio to indicate the side of a prosthesis that is opposite the occlusal or cameo surface.

The inventive systems disclosed are beneficially applicable to screw-attached prostheses and abutments. Key benefits of screw-attachment are variable tightening torques and reversibility. The terms permanent, semi-permanent, definitive and final when referring to screw-attachment are used interchangeably in this disclosure. A conventional screw that is definitively attached can still be removed by accessing the screw and rotating it in the opposite direction that was used for attachment. For the purposes of screw-attached prostheses for this disclosure, the attachment is semi-permanent, permanent or definitive in the sense that frequent attachment and removal is not anticipated for normal use. In contrast, a temporary screw attachment is applied for a planned process duration or other anticipated interval. The positioning of the Ti bases in the dental prosthesis may be effectively performed with a lift-off process using the temporary screws disclosed in U.S. Pat. No. 11,311,354 by the same inventors, which is herein incorporated by reference in its entirety. However, the utility of inventive concepts in this disclosure are not dependent upon using the system or methods disclosed in the referenced patent.

Screw attachment of an abutment to an implant is also described in the embodiments. However, some of the disclosed concepts may readily be adapted to other systems that do not utilize screw attachment of dental components to an implant such as snap-on, adhesive bonding or magnetic systems. Although less flexible, the implant and abutment may be assembled prior to presentation to the patient or features of the abutment may be directly incorporated into the implant while still benefiting from angular adjustability concepts disclosed with separate abutments and implants. These modifications are considered to be obvious variations of the inventive concepts described in the current disclosure.

Removal of a semi-permanent or definitive screw is generally motivated by a problem or an opportunity for an improvement. Access to the screw to apply a tool for removal may require removal of material covering the screw that was added for aesthetic reasons. Some embodiments provide for adjusting the orientation of the multi-unit abutment when the prosthesis is positioned on the multi-unit abutment without a semi-permanent or definitive screw in place. This may improve the passive fit of the prosthesis to implants when initially installed or after the system has been used for an extended period of time. While the implant abutments are generally used initially to position the Ti bases in the prosthesis, individual alignment errors will necessarily accumulate during subsequent processing or over time. The apparatus and methods disclosed below allow the set of Ti bases in the prosthesis to be used for fine tuning the alignment of the multi-unit abutments to the set of Ti bases to improve the overall passive fit. That is, forces applied to a prosthesis with embedded copings can exert forces on abutments that are lightly fixed in position to a new position that is more aligned with the copings. The abutments may be more rigidly fixed in the new position. Similarly, snap-on systems may also benefit from using the prosthesis to fine tune the orientation of a multi-unit abutment to reduce mechanical stresses or improve retention.

Elements disclosed herein may be characterized as having an axis or a longitudinal axis. In the case of a long cylindrical object like a pencil, the longitudinal axis is unambiguously through the center of the cylinder from the writing end to the eraser end of the pencil. The longitudinal axis is traditionally considered to be along the length or longest dimension of an object characterized by length, width and thickness in descending dimensional magnitude. If instead of a pencil, a threaded bolt is considered, the axis or even longitudinal axis may be considered to be through the center from the engaging end of the threads through the center of the head of the bolt. The rotational axis in this case and the longitudinal axis are the same even for stubby bolts. In this disclosure, the axis or longitudinal axis of an object with screw threads will be the same as the rotational axis of the threading. Widths will be measured perpendicular to this rotational axis. Thus, a traditional nut with interior threads would be considered to have a longitudinal axis through the middle of the central aperture, i.e., where the matching bolt's axis would be located when engaged. By extension, a washer without threads captured between a bolt and a nut would also be considered to have a longitudinal axis or simply an axis centered in the aperture and perpendicular to the plane of the washer. For the purposes of this disclosure, a linear assembly of components results from having the component axes of the assembly in a roughly colinear arrangement. Thus, an assembly comprising a bolt with a washer and nut would be a linear assembly even if the axis of the washer can move around the shared axes of the bolt and nut due to the washer aperture being larger than the width of the threaded section of the bolt. External threading is generally characterized as having a minor diameter measured at the root of the threads and a major diameter measured at the crest of the threads. Internal threading is generally characterized as having a minor diameter at the crests and a major diameter at the roots. Unless otherwise specified, the width of the external threads on a bolt stem is defined to be the major diameter or maximum deviation from the bolt's axis, that is, what would be measured with calipers. The width of the internal threads of a nut is defined to be the minor diameter of the internal threads or minimum deviation from axis of the nut, that is, what could be measured with a pin or plug gauge.

In this disclosure some threaded elements that tighten by relative rotation may have some characteristics that could be considered nut-like and others that are screw-like, such as elements having both female and male threading. The term "screw" will be used generically in this disclosure for these threaded elements in discussing the inventive concepts. However, external threading on a screw will be considered to be male and internal threading will be considered to be female. The phrases screwing into and threading into are used for male and female parts. That is, screwing a first piece into a second piece does not require the first piece to have male threads. A conventional bolt may be generally described as being threaded into or onto a conventional nut when their threads are engaged in this disclosure unless clearly restricted.

For the purposes of this disclosure, the term "ball" means a mechanical structure that includes some geometric attributes of a sphere. It is used broadly to be a more generic term that allows for only some portions of the surface of the ball having essentially spherical surfaces while other portions can deviate significantly from having spherical surfaces. Spherical surfaces are preferred for some of the orientational flexibility and scaling of the contact surfaces between a ball and a structure that can be repositioned and locked in position relative to the ball perhaps by swiveling. A "shell" (which can also be described interchangeably as a "swivel shell" or "swivel") is something that at least partially surrounds at least part of a ball. Contacting surfaces between the exterior of a ball and the interior of a shell are preferably spherical surface segments of about the same diameter for increased frictional grip when starting the fixing process or for providing a scaling surface to block the interior of the assembly from biological contamination. Including structures or deviations typically having a smaller size than the spherical radius may be included to improve sealing or tailor resistance to movement between a ball and a shell compared to smooth spherical mating surfaces. While having the flexibility to position the axis of a prosthetic screw and Ti base without restriction up to an angle of 30 degrees with respect to the axis of an implant and at any rotation angle around either axis may be preferred, mating elements of the implant, ball, shell or Ti base may be designed to restrict this omnidirectional angular flexibility. Such restrictive modifications are known in the art and may be used with some inventive concepts disclosed here. The structures with spherical surface portions in this disclosure are generally characterized by a linear or longitudinal axis due to their threaded interfaces. In analogy to the planet earth, ball structures may be considered to have a northern and a southern hemisphere separated by an equator perpendicular to the linear/longitudinal axis extending through the center of the ball. In this disclosure, hemispheres are not required to be ideal geometric structures that are exactly half of an ideal geometric sphere; a hemisphere may refer to only a smaller portion of a theoretical sphere. In the drawings, the northern or upper hemisphere is generally illustrated as the proximal hemisphere and the southern or lower hemisphere as the distal hemisphere. Shell structures with spherical interior surface portions surrounding a ball may be described as having proximal and distal hemispheres similar to how the earth's atmosphere surrounding the earth's crust can be separated into northern and southern atmospheric hemispherical layers. The equator of the shell would be located between the hemispheres in a plane perpendicular to the longitudinal axis of the shell. Some shell structures in this disclosure have interior spaces that include a hemispherical surface hollow section merged proximate the equator with a cylindrical void of at least the same diameter. The cylindrical void allows this type of shell to be moved axially over the ball portion of an abutment base to have a portion of the hemisphere of the ball contact the hemispherical hollow of the shell.

For the purposes of this disclosure, the term "one-piece" applied to a component should be interpreted as having no parts that form the functional feature(s) that are not integrally formed. That is, a one-piece component has no mechanical joints or seams in any portion for a specific function identified for the component that benefits from being one-piece. In this disclosure, a one-piece shell provides a one-piece integral monolithic body with spherical clamping potions and without any seam (devoid of any seam) between parts in the contact area on both sides of a ball equator or that forms all ball contact surfaces to form continuous sealing as the term is used in this disclosure. Thus, to be clear, the term "one-piece" with reference to the shell does not exclude a monolithic structure that has an addition of another component that is not essential for the interface characteristics of the spherical clamping interface.

There may be interfaces on a one-piece part for joining to other parts in a higher assembly, but that higher assembly would not represent a one-piece part when assembled. One-piece parts are monolithically constructed of a single piece of continuous material, but the shape may change without modifying its one-piece character. This disclosure includes descriptions of a one-piece shell comprising spherical clamping surface portions on both sides of a ball equator to form continuous ring seals in both spherical surfaces above and below the equator of the ball. Although the one-piece shell is necessarily modified in shape to create these interface portions with the ball, it remains a single piece of continuous material throughout this process. The shell remains one-piece but is part of a multiple-piece assembly with the ball. In contrast, in FIG. 3 the shell is formed by mechanically bonding of swivel base 3 and swivel mount 2. Even though these two parts may be welded at interface 12, their assembly does not result in a one-piece shell as the term is used in this disclosure. Rather, swivel base 3 and swivel mount 2 remain two pieces before or after the welding or other joining operation.

For the purposes of this disclosure, the term "to fix one part in position" means to maintain the relative position of that part with respect to another part sufficiently for a purpose. That is, the degree of fixing is variable depending on the desired resistance to movement for processing or use. Fixing should not necessarily be interpreted as a permanent state of relative position unless the fixing is described as being explicitly done with a typically permanent process such as welding. In many parts of this disclosure, fixing results from mechanical forces and frictional resistance to movement. Parts that are fixed for one step in a process may be reoriented with the application of sufficient force for a subsequent step. The context of the discussion should be considered in interpreting the degree of fixing desired. Note that parts may be constrained to not separate from one another without having their relative orientations fixed in position. For example, the swivel shell 32 in FIG. 6 cannot be separated from the ball portion 13 after ball 50 is welded to base 52, but it can move axially a finite distance towards the base 52 without resistance in the absence of the lock screw 49. While the swivel shell 32 is constrained by the ball 13 and width of the base 52 being larger than the distal aperture of the shell, the relative orientation of the swivel shell 32 to the other parts of assembly 101 are not fixed without use of the lock screw 49.

It is common in prosthodontics to secure threaded elements to a desired torque or to have some elements fastened to a higher or lower torque than some other combination of elements. For example, if three elements are screwed together in sequence, it is common to prefer that the first two are assembled with a higher torque so that the third element can be attached or removed without affecting the attachment of the first two. In some cases, torques are quantified with torque wrenches and sometimes the experience of the practitioner is used to determine when the torque is sufficient for functioning as desired. For the purposes of this disclosure, these torques will be considered to be predefined whether assessed in a quantitative or a qualitative manner. If a quantitative minimum torque value or acceptable range is specified to be essential, measurement with a tool or with some indication structure built into the parts is expected. In some embodiments, it may be desirable to prevent excessive torquing that could cause structural or biological stress on the implant seating or prosthesis through controlled failure of sacrificial elements. This controlled mechanical failure may result from both intentionally weakened structures or characterization of inherent failure characteristics of uniform structures. In other cases, practical minimum torques may be obtained by limiting thread lengths so that relative rotation is stopped by threads bottoming out. Different desired or predetermined torque levels may be used in a quantitative or qualitative sense to provide different levels of relative orientational fixing between parts. For example, the desired torque may represent any torque in a range between the minimum amount of torque such that parts will not reorient due to gravity and the maximum amount of torque that still allows parts to move relative under an applied force from contact with another part, such as a seating force applied to a prosthesis coping in contact with a multi-unit abutment. The actual magnitude of the desired torque will depend upon physical characteristics and the application environment. The resulting desired level of holding or fixing will naturally follow from the context of why and how the torque is being applied.

For the purposes of this disclosure, "surface contact area" should be interpreted from a macroscopic perspective unless explicitly otherwise specified. An example may be useful in understanding this term. If a small metal plate is placed on top and in the middle of a much larger plate, the surface contact area of these two elements as used herein will simply be the bottom face area of the smaller plate. Due to small variations in planarity, machining tolerances or surface roughness, it is appreciated that there will be some places between the plates that are filled with air where there is not intimate contact between the plates. Some of this air could be removed by applying sufficient pressure with a hydraulic press, but from a macroscopic perspective, the surface area would not increase as the term is generally construed in this disclosure.

Other terms in the specification and claims of this application should be interpreted using generally accepted, common meanings qualified by any contextual language where they are used. The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "about" and "essentially" mean±10 percent. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y." Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation. The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting. Other objects, features, embodiments and/or advantages of the invention will be apparent from the following specification taken in conjunction with the following drawings.

BRIEF DESCRIPTION OF THE FIGURES

FIG. 3 is a side cross-sectional view of the linear assembly of the first embodiment without the prosthetic screw.

FIG. 4 is a side cross-sectional view of the assembly of the first embodiment after fixing the Ti base at angle b.

FIG. 5 is a top exploded isometric view of a second embodiment of an omnidirectional multi-unit abutment with Ti base and prosthetic screw.

FIG. 6 is a top isometric view of the embodiment of FIG. 4 in a linear assembled configuration.

FIG. 7 is a cross-sectional view of a portion of the embodiment of FIG. 4 along the longitudinal axis.

FIG. 10A is a cross-sectional view of the lower portion of the omnidirectional multi-unit abutment assembly of FIG. 8 prior to ball capture forming/assembly.

FIG. 10B is a cross-sectional view of the lower portion of the omnidirectional multi-unit abutment assembly of FIG. 8 after ball capture forming/assembly.

FIG. 11A is an enlarged view of a portion of FIG. 10A showing the interface of the swivel shell and ball.

FIG. 11B is an enlarged view of a portion of FIG. 10B showing the interface of the swivel shell and ball with distal end of swivel shell shaped to capture the ball.

FIG. 18 is a top exploded isometric view of an embodiment of an omnidirectional multi-unit abutment assembly using a snap-on coping.

FIG. 19 is a bottom exploded isometric view of an embodiment of an omnidirectional multi-unit abutment assembly using a snap-on coping.

FIG. 20 is a top isometric assembled view of an embodiment of an omnidirectional multi-unit abutment assembly using a snap-on coping.

FIG. 21 is a bottom isometric assembled view of an embodiment of an omnidirectional multi-unit abutment assembly using a snap-on coping.

FIG. 25A is a side isometric view of an orientation tool for a prosthetic screw attached omni-directional multi-unit abutment.

FIG. 25B is a side cross-sectional view of an orientation tool for a prosthetic screw attached omni-directional multi-unit abutment.

FIG. 26 is a side plan view of the orientation tool of FIG. 25A coupled to a multi-unit abutment.

FIG. 27 is a cross-sectional view of the orientation tool of FIG. 25A in a linear arrangement with a multi-unit abutment.

FIG. 28 is a cross-sectional view of the orientation tool of FIG. 25A in an angled orientation with the third embodiment of FIG. 8.

DETAILED DESCRIPTION

There are multiple embodiments included in this disclosure to illustrate options for providing the benefits of an omnidirectional multi-unit abutment.

To address one or more of the above challenges and limitations of the current multi-unit abutments available on the market, new multi-unit abutment embodiments are contemplated that can be omnidirectional in the sense of being able to be positioned over a continuous range of orientations sufficient for correcting implant angulation differences typically found in general practice. While angled implants may be desired for structural reasons, angled implants may also be preferred simply for aesthetic reasons, for example, to reorient screw access holes in single tooth crowns.

Figure 1:
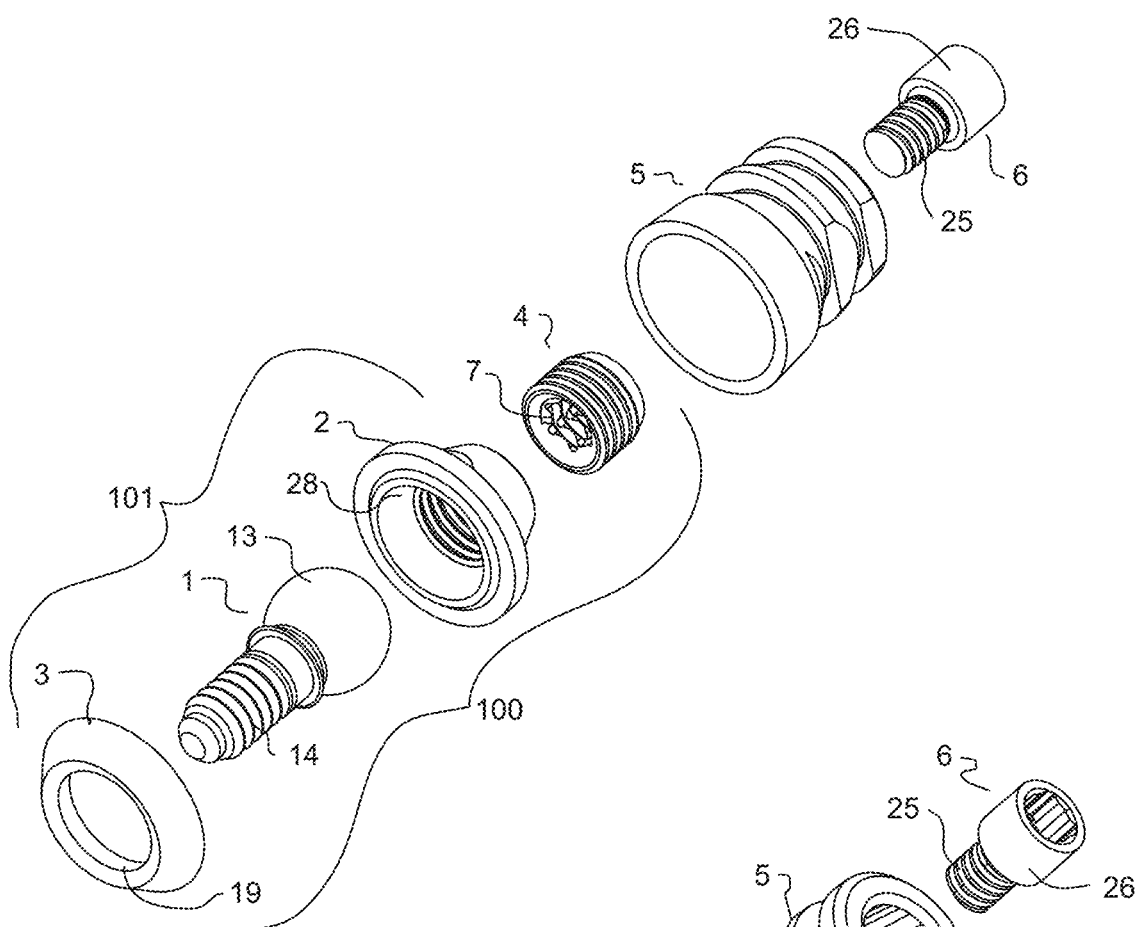
FIG. 1 is a bottom exploded isometric view of a first embodiment of an omnidirectional multi-unit abutment assembly with Ti base and prosthetic screw.
Figure 2:
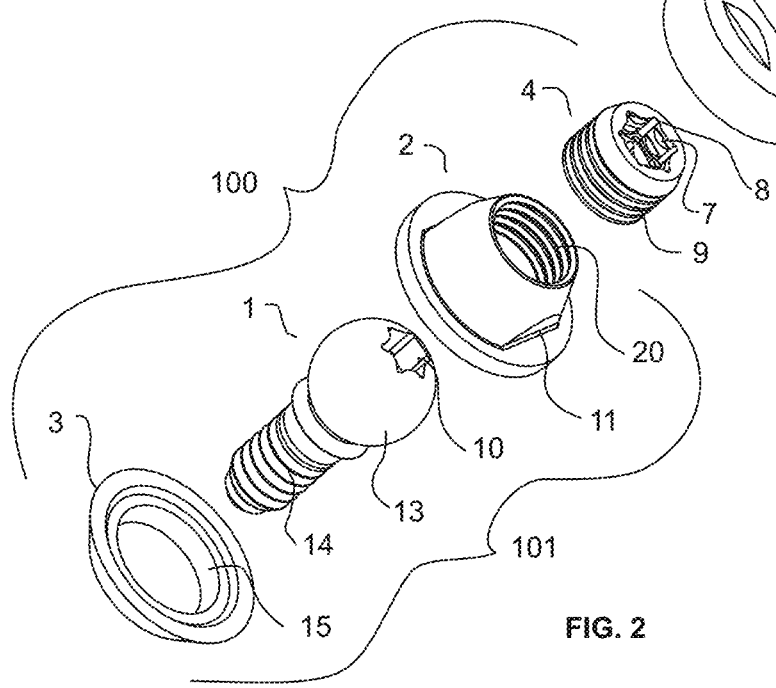
FIG. 2 is a top exploded isometric view of the first embodiment of an omnidirectional multi-unit abutment assembly with Ti base and prosthetic screw.

As shown in the exploded views of FIGS. 1 and 2, this omnidirectional multi-unit abutment 100 comprises four parts: an abutment base 1, swivel mount 2, swivel base 3, and lock screw 4. A Ti base 5 and prosthetic screw 6 with threaded shaft portion 25 and head portion 26 are also shown. FIG. 3. shows the elements of FIGS. 1 and 2 except for the prosthetic screw 6 in a linear orientation. FIG. 4. illustrates internal features of the assembly of FIG. 3 with the assembly tilted at an angle relative to the implant axis. FIG. 4 shows a cross-sectional view of these elements mounted to an implant 16 with the swivel assembly and Ti base fixed with the lock screw 4 at an angle b relative to a radial axis of the implant. This horizontal (broken) line in the figure may be considered to be the plane of the equator of the ball portion 13. The ball portion 13 of the abutment base 1 may be captured between the swivel base 3 and the swivel mount 2 which comprise a swivel shell around the ball portion 13 with the abutment base screw thread portion 14 extending through swivel base aperture 19. For this insertion process, the aperture 19 must be larger than the abutment seat projection 21. The swivel base 3 and swivel mount 2 are preferentially joined at mechanical interface joint 12 by continuous welding or spot welding, for example, with a laser after positioning around ball 13 to form base assembly 101. This joining technique provides a strong assembly of a thinner shell over a shorter distance, but other joining techniques may be used to capture the ball portion 13 within a shell. As shown in the cross-sectional view of FIG. 3, after joining, the mechanical design of the internal curvature 15 and aperture 19 of the assembled swivel base 3 and internal curvature 28 of the swivel mount 2 may be designed to prevent the ball portion 13 of the abutment base from escaping the swivel shell. The relative sizes and shapes of the aperture 19 and the size and shape of the abutment base 1 at the abutment seat projection 21 determine the range of tilt possible. In general, if the swivel base aperture 19 and the minor diameter or width of the internal threads 20 of the swivel mount are both less than the width of the ball 13, then the ball 13 is captured within a shell absent the lock screw 4. Apertures 19 and abutment seat projections 19 illustrated have axial symmetry to provide the largest flexibility in tilt and azimuthal angle settings. If desired, asymmetric features could be incorporated to restrict orientation flexibility.

By mechanically attaching the swivel mount 2 to the swivel base 3, these parts are loosely constrained by ball portion 13 of the abutment base 1 in the absence of lock screw 4. To fix the orientation, pressure is applied on the proximal portion of the ball 13 through engaging threading 9 with threading 20 and torquing lock screw 4 using drive feature 8 to pull the interior surface of swivel base 3 into contact with the ball 13 sufficient to hold the relative orientation of these parts. As illustrated, the interior curvature of the swivel mount 2 does not contact the ball when the lock screw 4 is tightened against the ball 13. That is, there is a gap 29 between the spherical surface of the swivel mount and the ball above the equator of the ball shown as a dotted horizontal line. Since these parts are only a few millimeters wide, this gap 29 is a practical way to ensure intimate mating of the swivel base 3 to the swivel mount 2 when they are welded or threaded together at 12 and to provide intimate contact of the spherical interior 15 of swivel base 3 with the ball 13 when these surfaces are pulled together with the lock screw 4 as spherical surface 46 contacts the ball 13. Gaps at the lower contact surface between the ball and the shell assembly at the shell aperture 19 are undesirable as they can promote the growth of pathogens. Due to the two-piece construction and gap 29, the loosely-constrained shell can wobble somewhat on the ball with a loose lock screw 4. When the lock screw 4 is tightened, the lower portion of the shell is pulled against the underside of the ball to fix the orientation and seal the bottom of the swivel base against the ball as illustrated in FIGS. 3 and 4. Coping 5 can be fixed by engaging prosthetic screw threads 25 with interior threading 7 of the lock screw 4.

FIGS. 5-7 illustrate a two-piece stem used to capture a swivel. In this embodiment, the abutment base assembly 101 is fabricated from swivel 32 and a ball with taper stem 50 that has a ball feature 13 with drive feature 10 at the proximal end and tapered stem 51 at the distal end. The tapered stem 51 is welded or otherwise joined to a base 52 having a tapered socket 53 at the proximal end and an abutment base screw thread 14 at the distal end. The widest part of the ball with taper stem 50 is the diameter of the ball 13. Swivel 32 is loosely captured by inserting the tapered stem 51 into the proximal side of the swivel 32 before inserting the tapered stem 51 into the tapered socket 53 for welding. In the embodiment illustrated, the minor diameter of the internal threading 38 of the swivel 32 is large enough to allow ball 13 to be inserted downward through the internal threads 38 of the swivel mount 32. Note that this approach of capturing the swivel 32 to the ball 13 prevents the swivel 32 from falling off the ball 13. The swivel 32 contacts the distal surface or lower hemisphere of the ball similar to the swivel base 3 of the first embodiment of FIGS. 1-4, but also provides the Ti base seat 41 to support the Ti base 5 in a known orientation analogous to that provided by of the previous Ti base seat 22 of swivel mount 2. Until the lock screw 49 is installed, the swivel is captured, but is free to move axially or wobble somewhat. The swivel 32 must be physically held, for example, by optional flat feature 11 to engage the threads in order to tighten the lock screw to squeeze the ball between the lock screw 49 and swivel 32. Lock screw 49 may have optional flats 64 to provide a tool interface for tightening the lock screw 49 relative to the swivel 32. s shown in the linear arrangement of FIG. 7, the swivel 32 only makes contact with the ball 13 below the equator of the ball in this linear arrangement. After capturing the swivel 32 and installing and tightening the lock screw 49, the ball 13 contacts the swivel 32 along a seating surface 47. About 17.5 degrees of seating/interference surface is illustrated in FIG. 7. The lock screw 33 also makes contact with the ball 31 along a spherical interface 46 as before, above the equator line shown in FIG. 7.

A primary goal of new abutment designs is to make them compatible, or substantially similar with commonly used sizes and styles of abutments. Therefore, physical dimensions such as the diameter of the seating surface, height of the abutment seating surface above the top of the implant, shape of the top of the abutment (e.g. substantially conical), use of conventional prosthetic screw-sizes, etc., produce many constraints in designing the subject adjustable abutments. Yet another design goal is a system that may be adapted to varied base types (e.g., different base screw threads, base diameters and shapes, etc.), without having to re-design and test the critical functional parts of the adjustable abutment. With the aforementioned constraints, the 30-degree adjustment, along with considerations of wall-thicknesses, tolerances, manufacturability, mechanical strength, ability to access, deliver and tighten the abutment components are further design considerations and constraints. Base assemblies must also pass fatigue testing such as 5 million sinusoidal cycles applied to the multi-unit abutment at a 40-degree angle relative to the primary axis of the base, using a minimum load of about 325 N. Meeting this specification requires a minimum diameter of the neck area that is also free of stress-concentrations.

Figure 8:
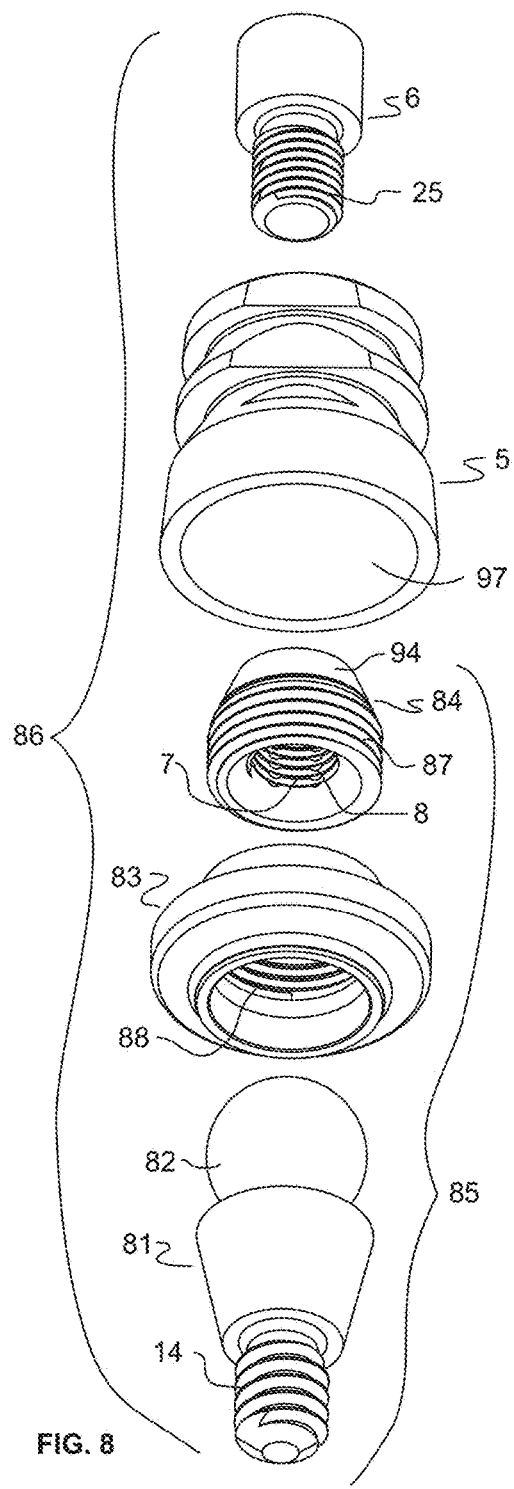
FIG. 8 is a bottom exploded isometric view of a third embodiment of an omnidirectional multi-unit abutment assembly with Ti base and prosthetic screw prior to assembly.
Figure 9:
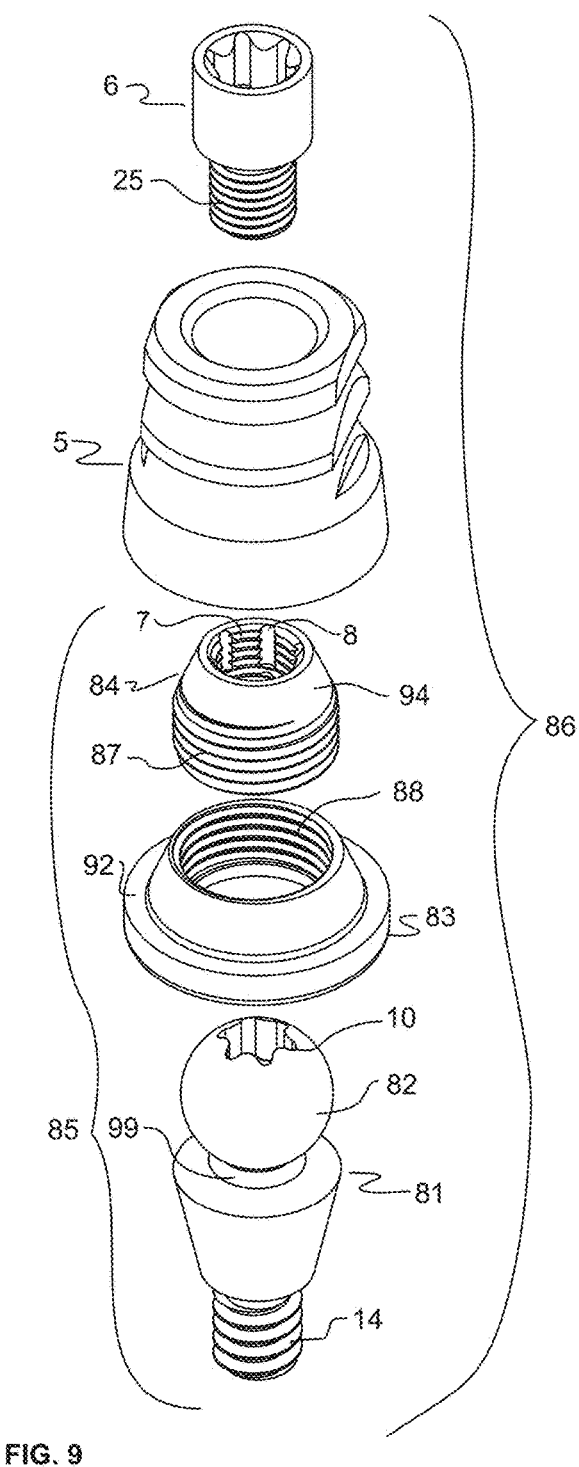
FIG. 9 is a top exploded isometric view of the omnidirectional multi-unit abutment assembly with Ti base and prosthetic screw shown in FIG. 8, also prior to assembly.
Figure 12:
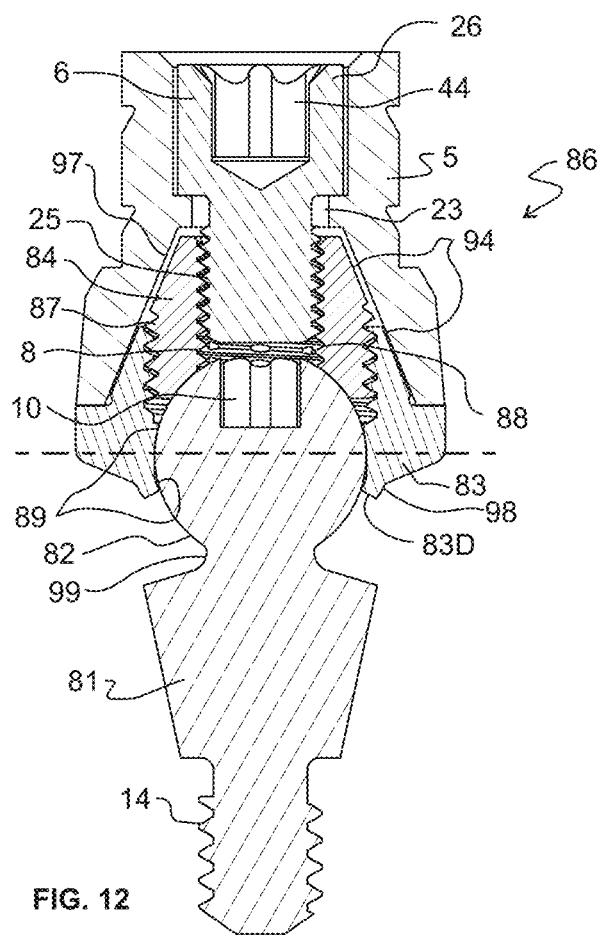
FIG. 12 is a cross-sectional assembled view of the omnidirectional multi-unit abutment assembly of FIG. 8.
Figure 16:
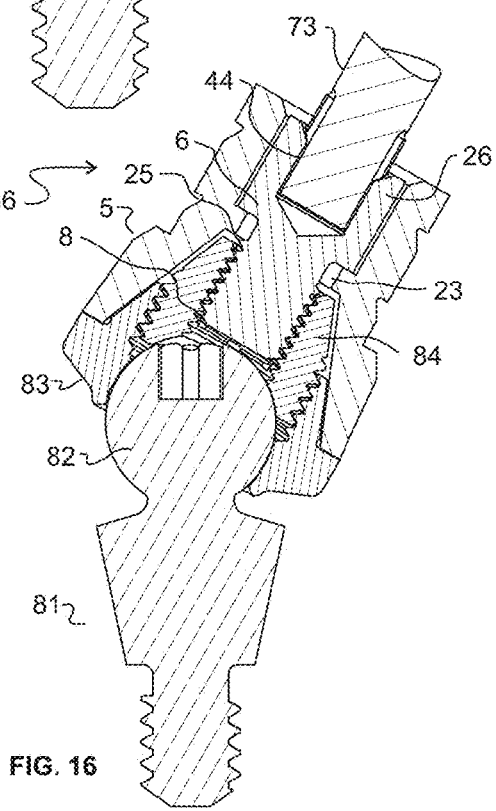
FIG. 16 is a cross-sectional view of the omnidirectional multi-unit abutment assembly of FIG. 8 illustrating the attachment of the Ti base with the prosthetic screw.
Figure 17A:
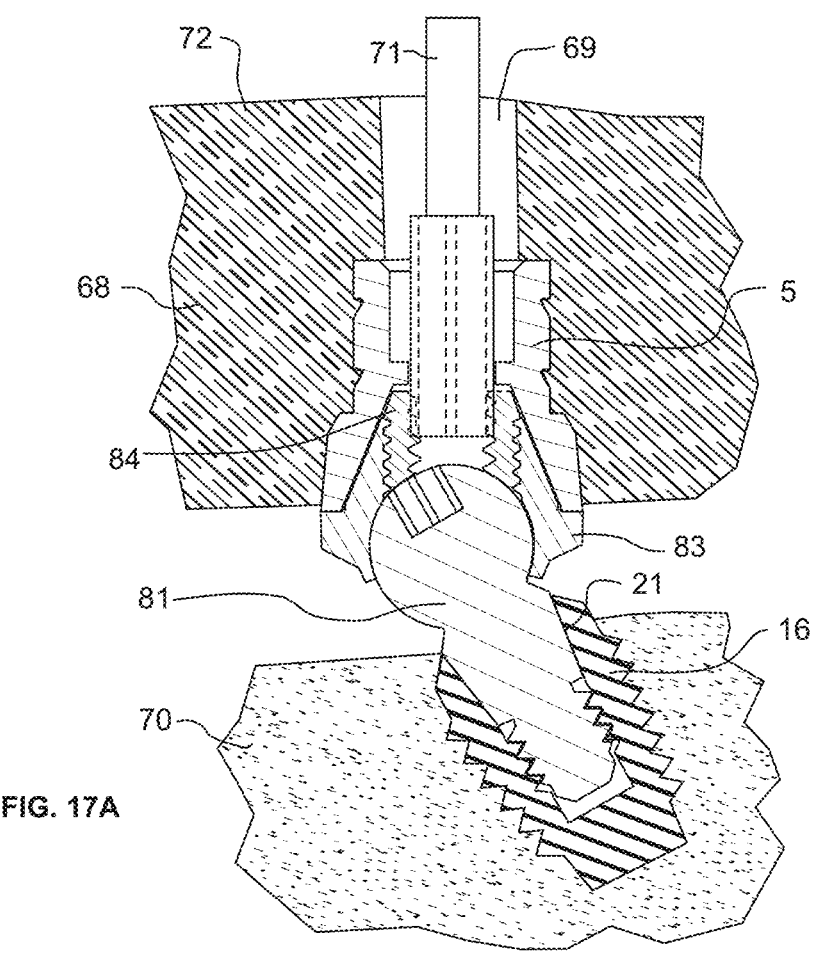
FIG. 17A is a cross-sectional view of the installation/application environment of a representative embodiment of an omnidirectional multi-unit abutment including prosthesis and implant.

FIG. 8 and FIG. 9 illustrate an exploded view of one embodiment of an omnidirectional multi-unit abutment 85 comprising three parts: an abutment base 81, one-piece swivel 83, and lock screw 84. A representative Ti base 5 and prosthetic screw 6 proximal to the multi-unit abutment 85 to define a multi-unit abutment assembly 86 are also shown in the exploded drawings of FIG. 8 and FIG. 9. The Ti base 5 and prosthetic screw 6 provide the mating mechanical interfaces to the multi-unit abutment 85. The one-piece abutment base 81 illustrated has a similar exterior profile as previous embodiments. The lock screw 84 illustrated has a proximal exterior surface 94 with a tapering profile similar to the exterior profile 94 of the swivel shell 83. These tapering surfaces may be used as a mechanical interface to assist alignment of the tapering interior surface 97 of the coping 5 as it moves into seating with seat 92. As in FIGS. 1-7, the lock screw 84 is illustrated with interior threads 7 for prosthetic screw 6 and exterior threads 87 that engage threads 88 of the swivel shell 83 to apply a higher clamping force on the ball 82 at a desired orientation. The swivel shell 83 and other components of the omnidirectional multi-unit abutment system assembly 86 may be made preferably of titanium or any other suitable material for implant abutment systems including precious and non-precious metals and alloys, ceramics, and high-strength engineering polymers (e.g., PEEK, PEI), or combinations of the aforementioned materials. Treatments, coatings or gels may be added to surfaces or in spaces between parts to prevent undesired biological growth or advance healing. Mechanical structures including integral ridges, rings or gaskets may also be included with any of the embodiments for the same purpose. Note that the presence of the Ti base 5 is shown for illustration purposes in FIGS. 8, 9 and 12. Ti base 5 is ultimately retained in the prosthesis 68 as shown in FIG. 17A and attached to the omnidirectional multi-unit abutment of this embodiment using prosthetic screw 6 as shown in FIG. 12. Prosthetic screw 6 may be a permanent screw or may be a provisional fastener of the type described in co-owned U.S. Pat. No. 11,311,354 and other applications related by continuity. FIG. 12 is a perspective view of the assembly 86 of FIGS. 8 and 9 in a linear configuration. FIG. 16 is a side view of the embodiment tilted at about 30 degrees. FIGS. 13-17A show different stages in the installation of this embodiment into an implant and orientation adjustment and fixing.

Still referring to FIGS. 8, 9 and 12, the abutment base 81 includes a ball or spherical portion 82 which may be about 2.75 mm to 3.25 mm in diameter and neck 99 having a minimum diameter of about 1.1 mm, with an abutment base drive feature 10 on the proximal end 82P. The neck 99 is a high stress area, and a diameter of 1.4 mm has been shown to survive the typical device qualification loading of 325 N. A minimum radius on the neck 99 of about 0.1 mm and a surface finish of about 32 microinch max is desirable. Finer surface finishes through electropolishing, anodization or vacuum deposition of TiN, diamond-like carbon (DLC), noble metals, or other common medical and dental device coatings may be used to increase fatigue life or modify frictional interaction of the abutment base 81 with the swivel shell 83. As illustrated, this drive feature 10 may be a hexalobular internal (Torx) drive feature socket of T5 size, centered on the longitudinal axis at the top of ball 82. Other types or sizes of drive tools may be used. Drive feature 10 and its corresponding sized driver must be able to withstand the required tightening torque, typically about 35 N-cm, of the abutment base 81 into the implant 16 (FIG. 17A). At the distal end of the abutment base 81 is a threaded portion 14 for attachment to female threads of an implant 16 that is secured into the patient's jawbone 70. Typical thread sizes for this connection are m1.6×0.35 for a narrow diameter implant and M2×0.4 for a standard implant. The implant 16 and its attachment to the mandible or maxilla bones are described schematically in this disclosure since the inventive concepts of the omnidirectional multi-unit abutment can be adapted to interface with different abutments. The generic implant 16 illustrated in FIG. 17A with female threading is a very common design, but the abutment base attachment 14 and seating 21 may be adapted to conform to other implants. Of course, the implant 16 and abutment base 81 described may be replaced with a one-piece design.

Referring now to FIGS. 10A, 10B, 11A and 11B, the swivel shell 83 in FIG. 10A is illustrated pre-assembly and includes a proximal end 83P, a distal wall end 83D and an initial distal aperture shape 90 and an interior curvature portion 96 which is sized and shaped to essentially match the curvature 89 of the ball portion 82 of the abutment base 81. The swivel 83 illustrated includes internal threading 88 for attaching to the external threads 87 of the lock screw 84. It also includes a Ti base seating feature 92 for supporting and orienting the Ti base 5 when it is mounted with the prosthetic screw 6 to the omnidirectional multi-unit abutment 85 (the combination assembly of the abutment base 81 with ball 82 captured in shell 83 and with lockscrew 84 attached to the shell 83). The average diameter of the seating feature 92 is typically in a range of about 4 mm to about 6 mm. The swivel shell 83 may optionally include engagement features (not shown) that may be used to attach a tool such as a wrench to aid assembly or to restrict the azimuthal orientation (not illustrated) of the Ti base 5. Restricting the orientation of a Ti base 5 with matching engagement features of a Ti base and implant abutment is a common technique which is useful for single tooth crowns. The omnidirectional multi-unit abutment embodiments herein can be readily adapted to single tooth prostheses by fixing the azimuthal orientation of a non-cylindrically symmetrical Ti base with a matching abutment mounting surface which will not be described in detail.

The initial distal aperture shape 90 of the swivel shell 83 has a diameter sufficient to allow the ball portion 82 of the abutment base 81 to be inserted into the initial distal aperture shape 90 of the swivel shell 83 until contact is made with the spherical interior surface 96 of the swivel shell proximate the distal end of threads 88 as shown in the cross-sectional view of FIG. 10A. In this case, there is no restriction on the width of the abutment base below the ball as was described for assembly in the two-piece swivel shell of FIGS. 1-4. Unlike the embodiment of FIGS. 5-7, there is no restriction on the minor diameter of the internal threading 88 of the swivel 83. After insertion, the initial distal aperture 90 is reduced in size to capture the ball 82 inside the swivel shell 83 and form a ball 82 and swivel 83 lower assembly 95. FIG. 11B illustrates how the one-piece swivel shell 83 is inelastically deformed to produce the final distal aperture shape 91 with deformed distal end wall segment 98.

FIG. 12 is a cross-sectional view that illustrates the final assembly of parts in this embodiment including lock screw 84, coping 5 and prosthetic screw 6 with drive feature 44. The interior surface profile 96 has a curvature matching curvature 89 of the ball portion 82 of the base 81 and may be selected to reduce axial movement of the swivel shell 83 on the ball 82 without the lock nut 84 compared to, for example, FIG. 7. Note that this configuration provides spherical contact surface portions that are diametrically opposed. Contact is made above and below the equator (shown as the dotted line) of the swivel shell 83. That is, when longitudinal axes are aligned, the swivel shell 83 presses against the ball portion 82 in both the upper and lower hemispheres. As a result, the swivel shell 83 is free to tilt or rotate through a range of angles but is constrained to not move along the longitudinal axis of the implant abutment base 81. This curvature profile can also provide greater surface contact area to tailor frictional properties of the swivel shell 83 on the ball 82 without any contact of the ball 82 with the lock screw 84.

Figure 13:
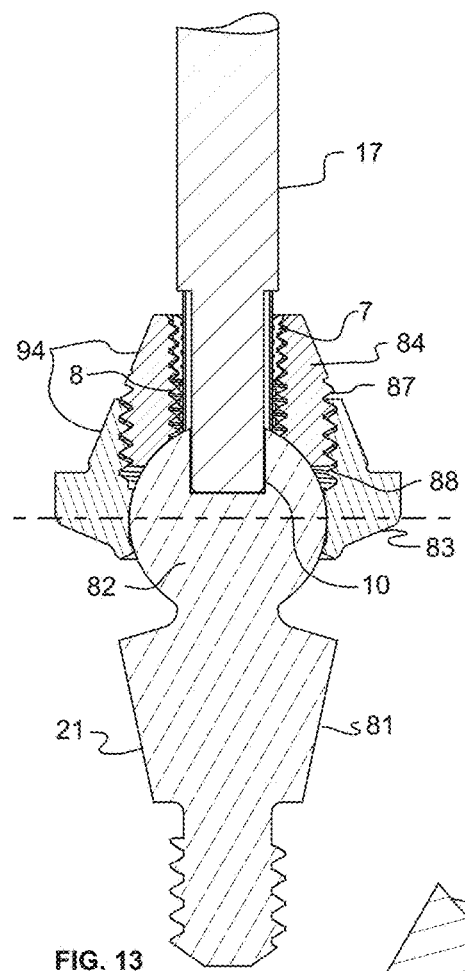
FIG. 13 is a cross-sectional view of the omnidirectional multi-unit abutment assembly of FIG. 8 in a linear arrangement with an implant drive tool for attachment to an implant.

Controlling the slip torque of the swivel shell 83 on the ball 82 independently of the lock screw 84 provides several benefits in using the multi-unit abutment. The threshold force for movement, or minimum slip torque, of the swivel shell 83 on the ball 82 can be predetermined in the design and manufacturing of the assembly 95. Slip torques in the range of 1 to 10 N-cm provide consistent holding of the relative position of the swivel shell 83 to the ball 82 during further assembly and processing steps. These steps may include helping to seal the interface of the ball 82 and the shell 83 at its distal end 83D of the shell to help avoid bacterial contamination during installation into a patient, individually aligning a plurality of swivels 84 in a jaw 70 to engage a plurality of Ti bases 5 in a fixed arrangement in a prosthesis 68, holding swivel shells in position for lift-off processing as detailed in referenced U.S. Pat. No. 11,311,354, and engaging and torquing the lock screw 84 without holding the swivel 83. This inherent swivel shell 83 orientation holding ability coming from the forces from the swivel shell 83 gripping the ball 82 above and below its equator are thus seen to assist not only in the assembly steps of adding the lock screw 84 to lower assembly 95 and adding the prosthetic screw 6 (or temporary screw from U.S. Pat. No. 11,311,354 for lift-off processing) and Ti base 5 to form assembly 86, but also provide predictable slip torques for other process steps by eliminating any contribution from contact of the lock screw 84 with the ball 82. The lock screw 84 can be finally torqued to a higher desired permanent fixing value after the initial orientation holding with just the swivel shell 83. Holding the swivel shell 83 orientation independently of the lock screw 84 also means that the tool interface 7 of the lock screw 84 may be aligned with drive interface 10 of the ball without affecting the slip torque in preparation for installation of the multi-unit abutment 85 into implant 16 as illustrated in FIG. 13.

The compressive forces necessary to provide deformation to capture the ball by the smaller final distal aperture 91 may be applied with any of the techniques known in metal working. The aperture reduction through inelastic deformation may be done with a cold, warm or hot metal working and/or forging process. Cold (metal) working is preferred due to better mechanical tolerance control and increased tensile strength through work hardening of the swivel shell 83 in the vicinity of the deformation. Cold working may also be beneficial in maintaining the exterior surface profile of the swivel shell 83 that interfaces with the interior of the coping 97 such as guiding surfaces 94 and seat 92. The mechanical properties of the ball portion 82 may also be selected to make it suitable for use as a backing support in the forging process. An advantage with this approach is that the frictional clamping characteristics of the swivel shell 83 and ball portion 82 can be controlled in the process of manufacturing the multi-unit abutment assembly without any dependence on the lock screw 84 making contact with the ball portion 82. The threshold force magnitude in this swiveling constrained state required to change the relative angle of the assembly and the initial linear configuration for installation can be provided by the OEM or supplier independently of any dental practitioner's on-site effort. In addition, the proximal and distal contact surfaces at 96P and 96D along curvature 89 shown in FIGS. 11A and 11B will help prevent the introduction of bacteria or other pathogens into the interior of the assembly during installation. By using the ball portion 82 as a backing support in this manner, spherical ring contact surfaces are formed at both the proximal and distal portions of the swivel shell 83 separated by its equator.

A preferred cold metal working process for forming the reduced aperture 91 is rotary swaging. For assembling lower assembly 95, rotary swaging may be done by holding the abutment base 81 while rotating the swivel shell 83 with longitudinal axes aligned and forcing a tool against the distal end wall 90W of the swivel shell 83 to sequentially move material near distal end 83D towards the axis of rotation to reform distal end wall 90W into distal end wall 91W. However, other metal forming processes, preferably cold working processes, may be used in deformation area 98 as long as the process can consistently generate the desired shape/deformation and retain minimum wall thickness Tm without inducing material weakness. Although process specifics will depend upon material characteristics and specific geometries, several process parameters have been determined to be significant on the performance of rotary swaging of the swivel shell. Testing has shown that applying an axial pre-load force Fp (FIG. 11A) to push the spherical surface 89 of ball 82 against the swivel shell 83 along the spherical interface 96 identified in FIG. 11A before deforming the wall 90W (FIG. 11A) to create wall 91W to effectively change the shape of the aperture 90 to aperture 91 is useful in providing consistent fixing of the swivel shell 83 to the ball 82. This axial pre-load force Fp may range from around 4 to 110 N, which is smaller than the maximum forces that might exceed 300 N in clenching teeth. Relative rotary motion between the swivel shell 83 and ball during the rotary swaging process may be used to polish contact surfaces. The swaging tool will make contact with the swivel shell near distal end 83D and push against the distal end wall 90W to create distal end wall 91W using a force F directed towards the longitudinal axis. As illustrated in FIG. 11B, the swaging tool path and force F is not directed strictly perpendicular to the axis of rotation. It includes an axial component (that is, in a direction angled more towards the center of the ball) that may be used to increase the radial clamping force of the swivel shell 83 to the ball 82. Although the inelastic deformation of the shell 83 to form reduced aperture 91 is the predominate deformation, some elastic deformation directed radially at the spherical contact surfaces may contribute to the force for friction to resist relative angular movement. Depending upon the forces applied and tool design and swivel shell 83 geometry, there may be material displacement that causes a reduction of wall thickness of 90W from its original wall thickness T in FIG. 11A to thickness Tm of wall 91W as shown in FIG. 11B accompanied with a slight elongation from material displacement.

Although FIG. 11B shows the swivel shell 83 being held on the ball 82 with contact above and below the equator to hold the ball 82 at any angle within the range of relative motion, the requirements on the extent of contact are asymmetrical under use in a patient. This asymmetry results in part from the large directional differences in forces applied by muscles in a jaw. While teeth can be clenched to provide forces in the range of 300 to 350 N pushing the swivel shell 83 down on the ball 82, the maximum separating forces that can be used to separate teeth stuck together, for example, with taffy to try and pull the swivel shell 83 up off the ball 82 are considerably less in magnitude and exposure frequency. In the cross-sectional illustration of FIG. 12, the strength in the downward direction is more critical in use of the multi-unit abutment 86 over time than the upper direction. To avoid any dependency on the lock screw 84 fit and variable torquing, the resistance to movement distally of the swivel shell 83 alone should be considered. This will depend upon the surface area interfacing with the ball portion 82 on the proximal surface. For proximally directed forces, the extent of the inelastic deformation that is done by moving the distal end 83D of the swivel shell 83 towards the axis and the thickness of the distal wall 91W will determine the pull-out resistance for forces in the proximal direction. These characteristic distances will also influence the static torque values to allow positioning of the swivel shell and the ability to torque both the lock screw 84 and the prosthetic screw 6 without holding the swivel shell 83.

Consider the swivel shell 83 contact with the ball 82 in the enlarged view of FIG. 11A. Due to the applied force in the axial proximal direction, the ball 82 will make contact with the internal curvature 96 of the swivel shell 83. The most proximal point of contact 96P will necessarily be located above the equator "eq" and at a radial distance R1 from the longitudinal axis of the abutment base 81. In FIG. 11A, this contact point 96P is associated with the threading 88 for the lock screw 84. From this point, the surface contact extends radially outward and downward towards the equator eq until it reaches a maximum outer radial distance of R2 at point 96E. For ideal parts, R2 is equal to the radius RB of the ball portion 82. Due to tolerancing of parts to ensure that the ball 82 can be slipped inside the swivel shell 83, R2 may be slightly less than RB for a particular design and manufacturing process precision capability. A difference of a few percent in these dimensions is not critical for the present discussion. The difference in radial distance R2 and R1, or X, influences the mechanical strength of the assembly of the swivel shell 83 and ball 82 resisting forces in the distal direction. It also determines the surface contact area in the upper hemisphere which influences the static torque resisting swivel movement. The threading size for the lock screw 84 and the shape of the Ti base 5 seating limit how large X can be. There are design tradeoffs in the capability of the swivel shell 83 alone to resist downward forces including the size and number of engaged threads 88 with the lock screw threading 87, the overall height of the abutment assembly 85 and the mating characteristics of the Ti base 5 along surface 94. A minimum X distance of about 0.04 mm has been found to be sufficient to handle the compressive forces directed distally with titanium parts. Multi-unit abutments sized to be compatible with widely used Ti bases with the basic design illustrated in FIGS. 11B and 12 shown have a surface contact area of the ball to the swivel shell above the equator of about 3.4 mm$^2$.

The inelastic deformation of the distal portion of the swivel shell 83 provides resistance to separation of the swivel shell 83 from the ball 82 under proximally directed applied forces, seals the swivel shell 83 to the ball 98 at reduced aperture 91 and influences the slip torque resisting swivel movement. As shown in FIG. 11B, the distal wall 91W of the swivel shell near distal end 83D after deformation contacts the ball over a distance along the ball surface profile terminating at the most distal point of contact 96D. This most distal point of contact 96D determines a radial distance from the longitudinal axis of R3. The difference between R3 and RB is designated X1. This dimension X1 and the minimum wall thickness Tm of wall 91W are important parameters in the functioning of the swivel 83. This distance X1 with a particular material helps determine the uniformity and reliability of the swiveling, and holding characteristics of the shell during processing both in allowing relative motion to align with the prosthesis Ti bases 5 when desired, but not moving when torquing the lock screw 84 and the prosthetic screw 6. Maintaining a minimum shell thickness Tm (FIG. 11B) in the inelastic deformation region 98 after the rotary swaging process is also an important consideration for maintaining consistent slip torque characteristics. In the case of titanium, a representative minimum thickness Tm of the distal wall 91W of about 0.1 millimeters (mm) is sufficient but starting with an initial wall thickness T at distal wall segment 90W (FIG. 11A) of about 0.25 mm and reducing by less than about 5% to a thickness Tm as shown for distal wall segment 91W in FIG. 11B as a result of the deformation process in the deformation region 98 has yielded consistent results. Thus, an example minimum wall thickness Tm can be in a range of about 0.1 mm to about 0.25 mm, including 0.2 mm, 0.3 mm, 0.4 mm, 0.5 mm, 0.6 mm, 0.7 mm, 0.8 mm, 0.9 mm, 0.10 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm and 0.25 mm. Other minimum wall thicknesses may be appropriate depending on the metal or metal alloy used. Although work hardening from cold metal working is often seen as a negative result that may be alleviated by annealing, that is not the case for the omnidirectional multi-unit abutments based on prototype testing. The additional tensile strength benefit does not appear to come with any negative consequences when a minimum thickness of 91W is maintained in the inelastic deformation region 98. X1 and the wall thickness Tm in the deformation region 98 also influence the sealing of the reduced aperture 91 to help prevent bacterial contamination ingress. These two parameters also determine the force necessary to pull the ball 82 out of the swivel shell 83. There are less constraints on these dimensions, mostly associated with the range of tilting of the swivel 83 without interference with the neck 99 of the abutment base 81. A distance X1 of about 0.13 mm provides consistent performance in titanium parts. The axial force required to separate the ball 82 from the swivel shell 83 by reversing the inelastic deformation from rotary swaging in actual parts has been measured to be in a range from 400 to 650 N, which is much higher than needed.

Similar to prior art lock screw 4, lock screw 84 illustrated has external threads 87 to engage the internal threads 88 of the swivel shell 83. These threads may be, for example, m3×0.35 size. Lock screw 84 also has internal threading 7 for attaching the prosthetic screw 6 and an internal drive feature 8 for tool attachment to tighten the lock screw 84 in the swivel shell 83. Representative prosthetic screw sizes include m1.4×0.3 threads, m1.6×0.35, UNF 1-72, etc. Drive feature 8 may be a socket accommodating common dental drivers including Torx T5 or T6, 0.035" to 0.050" hex or square drivers, or similarly sized straight and star drivers with different numbers of lobes and geometries. As illustrated, the internal threading 7 and drive feature 8 have a partial overlap along the longitudinal axis of the lock screw. This is a design choice. Complete axial overlap or no axial overlap are other design options.

The swivel shell 83 is configured to engage a segment of the spherical ball feature 82. As shown in FIG. 12, the ball portion 82 is spherical throughout the range of motion contact with the swivel shell 83 and lock screw 84. The figures and cross-sections shown illustrate an embodiment where the swivel base and mount may be positioned and rotated anywhere within a cone about the linear axis with 30 degrees of tilt. The tilt magnitude and orientations of adjustment allowed are a design choice, although 30 degrees of tilt is generally sufficient for most clinical applications. The tilt range limitation of 30 degrees in the illustrated embodiment results from interference of the swivel shell 83 proximate the aperture 91 and the abutment base 81. The interior curvature of the swivel shell 83 is essentially the same as that of the ball portion 82. The lock screw 84 also has essentially the same curvature as the ball 82 in the area of contact. However, the seal of the lock screw 84 to the ball 82 is not continuous due to the abutment drive feature 10 when tilted. However, when the Ti base 5 and prosthetic screw 6 are applied to the omnidirectional multi-unit abutment, the abutment drive feature 10 is effectively sealed.

The relatively large contact in the shape of a hemispherical ring of the hollow lock screw 84 to the ball 82 distributes the clamping force over a larger area than the concentrated contact of a solid set screw. The extended contact and matching curvature 96 of the swivel shell 83 to curvature 89 of the ball 82 has been determined to have sufficient frictional grab to allow tightening the lock screw 84 in excess of 25 N-cm without holding the swivel shell 83 when parts are made of titanium. The relatively large contact area also minimizes distortion of the ball 82 from clamping compared to a concentrated solid set screw, which cases repositioning of the tilt or azimuthal angles without interference from distortions of the ball 82 geometry. The relatively large outer diameter of the locking screw 84 also provides sufficient wall thickness between internal threading 7 and external threading 9 for mechanical strength for applying torque to the lock screw 84 with drive tool sizes comparable to the width of the threads of the prosthetic screw 6.

The hollow style lock screw 84 and drive geometries illustrated in FIG. 12 provide benefits in dental system installation and maintenance. After the ball portion 82 of the implant base 81 is captured by the swivel shell 83, the lock screw 84 may be started into the swivel shell 83 and rotated enough to secure it but without contacting the ball portion 82 to form the omnidirectional multi-unit abutment assembly 85. The Ti base 5 may be optionally placed on top of the omnidirectional multi-unit abutment assembly and parts aligned along a common axis as shown in FIGS. 8 and 9. Ti base 5 is not required to be in place during installation and orientation of the abutment base 81, swivel shell 83, and lock screw 84. Thus aligned, a drive tool 17 may be inserted through the Ti base 5 and the lock screw 84 to engage the drive feature 10 of the abutment base 81 as illustrated in FIG. 13. Note that it may be necessary to slightly rotate drive tool 17 after passing through the lock screw 84 in order to engage the abutment base drive interface 10. Preferably the engagement fit of the drive tool 17 and abutment base drive feature 10 has sufficient friction to cause the omnidirectional multi-unit abutment 85 to remain on the drive tool 17 to present the omnidirectional multi-unit abutment assembly to the implant 16 as shown in FIG. 13. A slight torquing of the lock screw 84 in the unwind direction may help in this retention. As the drive tool 17 is rotated, the abutment base threads 14 engage the implant 16 and the omnidirectional multi-unit abutment assembly may be screwed down to attain the desired seating of the abutment seating surface 21 to the implant 16. Since the drive tool engages both the abutment base 1 and lock screw 4, these parts rotate simultaneously. Since the lock screw 84 position is not changing with respect to the abutment base 1, the ball portion 82 is not being gripped by the lock screw 84. The rotational force from the drive tool 17 drives the abutment base threads 14 deeper into the implant 16.

The seating portion 21 of the abutment base that contacts the implant can be modified to match the seating geometry of fixed angle abutments. Drive feature 10 allows for securing the abutment base 81 threaded portion 14 to the implant 16. The tightening of the abutment base 81 to the implant may proceed until the desired seating pressure at the abutment seating surface 21 is obtained. A representative torque value is about 30 N-cm, although the value will depend upon the implant system employed and may be higher or lower than this. For immediate loading of a prosthesis, the torque value should be less than the torque value used to install the implant 16 into the jawbone.

Figure 14:
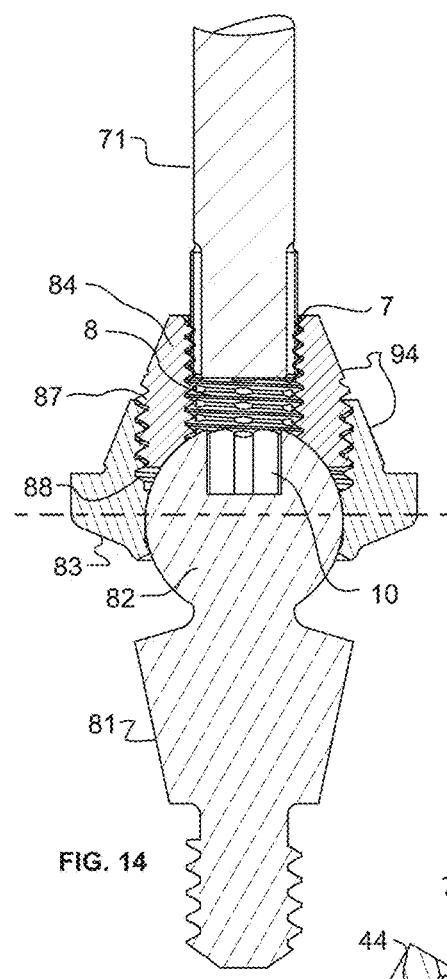
FIG. 14 is a cross-sectional view of the omnidirectional multi-unit abutment assembly of FIG. 13 with a lock screw drive tool in a linear arrangement after attachment to an implant.
Figure 15:
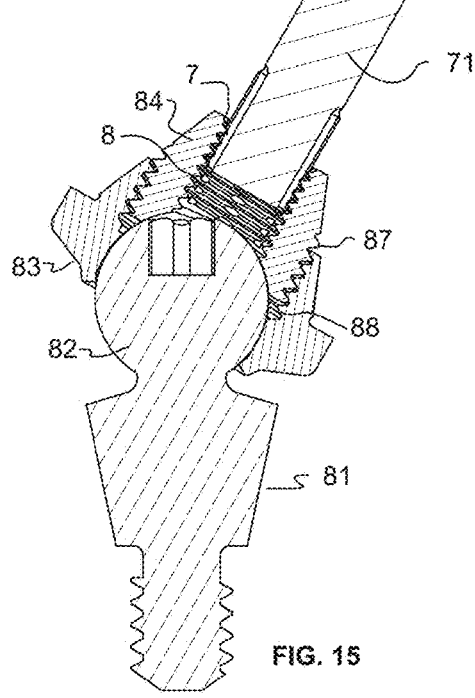
FIG. 15 is a cross-sectional view of the omnidirectional multi-unit abutment assembly of FIG. 14 with lock screw drive tool fixing the orientation.

As shown in FIG. 14, once the abutment base 81 is secured to the implant 16, the linear configuration of FIG. 13 is no longer needed. The tilt and azimuth angle of the swivel shell 83 to receive Ti base 5 desired for prosthesis attachment can be selected by movement of drive tool 71 which is inserted into lock screw 84. Rotating drive tool 71 causes the lock screw 84 to clamp ball portion 82 and lock the angulation of the omnidirectional multi-unit abutment 85. Engagement features (not illustrated) such as flats, small holes or splines may be used as anti-rotation or azimuthal selection features in these parts. Experience with actual parts has demonstrated that the shapes and surface finishes of the ball 82 and the contact surfaces of the swivel shell 83 and lock screw 84 with the ball can be tailored to provide sufficient friction to tighten the lock screw 84 with only the lock screw drive tool 71 to 40 N-cm. That is, it is not necessary to hold the swivel shell 83 with a tool when fixing the orientation of the abutment interface 94 and seat 92 for receiving the coping 5. In the case of a single tooth prosthesis, a selection feature on the swivel shell 83 engaging a rotational fixing feature on a Ti base allows the azimuthal angle of the Ti base to be selected and held while tightening the lock screw 84. A coaxial two-piece tool that engages the anti-rotation features and includes a drive tool similar to 71 may be used to orient and tighten the swivel shell 83 and lock screw 84 in position on the ball portion 82 of the abutment base 81. Having the Ti base 5 included in the arrangement of FIG. 15 may be convenient for azimuthal selection.

The drive feature 8 of the lock screw 84 is preferably accessible through the Ti base 5 in both a provisional and the final prostheses. This allows moving and re-torquing the lock screw 84 in the proper orientation should it loosen over time, making minor adjustments to improve passive fit, and replacing and realigning one omnidirectional multi-unit abutment 85 within a plurality of omnidirectional multi-unit abutments 85. From a comparison of the width of the drive tool 17 shown in FIG. 13 to the width of the drive tool 71 shown in FIG. 14, the drive tool 71 is larger than the drive tool 17. This is not required. A benefit of using two different sizes, for example, a T5 driver 17 to drive the abutment base 81 and a T6 driver 71 for securing the lock screw 84 provides extra clearance in the lock screw 84 while driving the abutment base. Since the torque used for driving the abutment base 81 may be chosen to be higher than the torque used for the lock screw 84, a first torque wrench with drive tool 17 and a second torque wrench with drive tool 71 may help ensure the desired torques are obtained. Of course, in order to allow the assembled omnidirectional multi-unit abutment 85 to be installed into the implant 16 as shown in FIG. 13, the size and shape of the drive tool 17 must pass through the lock screw 84. The drive tool 71 in FIG. 14 is prevented from passing completely through the lock screw 84 since the lock screw internal drive interface 8 shown does not extend all the way to the distal side of the lock screw 84. This overlap is a design choice.

Some practitioners may choose to use their muscle memory experience instead of a calibrated objective tool to determine when a predetermined desired torque is applied to the implant base 81 and the lock screw 84. If the abutment base drive interface 10 and lock screw drive interface 8 are the same size and shape, then one tool can be used for drive tool 17 and 71. In this case, after driving the abutment base 81 into the implant 16 as in FIG. 13, drive tool 17 only needs to be extracted just enough to disengage with the abutment base drive interface 10 before repositioning it to lock the omnidirectional multi-unit abutment 80 position by rotating lock screw 84. If different calibrated torques are desired, two different wrenches can be used with the same drive tool tip size. Some practitioners may prefer to leave the drive tip inserted in the omnidirectional multi-unit abutment for both torquing process steps and switch torque wrenches set to different values. Since the rotational axis of drive tool 17 is generally different than drive tool 71 (FIGS. 14, 15), using the same torque magnitude for the abutment base 81 and lock screw 84 may be acceptable. A torque wrench that has a push button or other selector to switch between two different torque settings may be useful. Automatic selection could be based on the difference between the deeper drive tool depth required to engage the abutment base drive interface 10 compared to the lock screw drive interface 8, for example, by requiring a force along the axis of the drive tool tip to cause a spring-loaded sheath to engage the higher torque mechanism. In this case, the lower torque setting could remain engaged, if desired, although it would slip.

FIG. 16 shows a cross-sectional view of the omnidirectional multi-unit abutment assembly 86 including prosthetic screw 6 that retains Ti base 5. A tool 73 is shown in the drive feature 44 of the prosthetic screw 6. Prosthetic screw 6 may be replaced with a separable fastener (not shown) as described in the referenced U.S. Pat. No. 11,311,354 to facilitate positioning of the Ti base 5 into the prosthesis with a lift off process. Note that even after the Ti base 5 is incorporated into the prosthesis, it is possible to access the lock screw drive interface 8 by removing the prosthetic screw 6. This is essentially changing the configuration from FIG. 16 to FIG. 15 but with tool 71 extending through the Ti base 5 as shown in FIG. 17A.

By merging the characteristics of the prior art swivel base 3 and swivel mount 2 into a one-piece swivel shell 83 in this embodiment, the size of the distal end of the abutment base 81 is not constrained by the aperture 90 at the distal end of the swivel shell 83. In the embodiment of FIGS. 5-7, the minor diameter of the swivel shell internal threads 38 must be larger than the diameter of the ball 31 to allow the ball portion of 50 to be inserted through the swivel shell 32 to be joined to the abutment base 52. A comparison of FIG. 7 with FIG. 12 shows that this results in a shorter depth for engaging threading between the swivel 32 and lock screw 49. Design tradeoffs are possible in the number of engaging threads and the wall thickness of the lock screw 84.

The lock screw 84 illustrated in FIG. 8 has a lock screw drive interface 8 of the similar form as that in lock screws 4 and 49 which allows tools to be inserted through a Ti base embedded in a prothesis to help align and lock the omnidirectional multi-unit abutment orientation to improve passive fit. If necessary, a wrench could also be applied to flats or other exterior tool gripping structures (not shown) on the side of lock nut 84 and swivel 83 to help with removal of a lock nut 84 containing a broken prosthetic screw thread since the Ti base 5 would not be covering them.

Photomicrographic cross-sections of samples in which the lock screw has been torqued to 20 N-cm confirm contact between the swivel shell 83 and ball 82 and lock screw 84 and ball 82. Testing of representative parts made with cold working were characterized by a swivel shell 83 slip resistance of about 3 N-cm. This value has no contribution from the lock screw 84 and is sufficient to hold components in temporary alignment for connecting to the implant, setting passive fit angle, and for tightening the lock screw 84 with only the lock screw drive tool 71. After setting the desired angle and torquing the lock screw 84 to 20 N-cm, this initial swivel shell 83 slip resistance is maintained upon loosening the lock screw 84 and repositioning the swivel shell 83. Testing has shown that the slip torque of the swivel shell 83 after torquing the lock screw 84 is about the same value as the lock screw 84 torque setting. That is, torquing the set screw 84 to 25 N-cm resulted in an angle fixed swivel shell 83 slip resistance in the range of 21-27 N-cm. The initial swivel shell 83 slip resistance and torqued lock screw 84 slip resistance values of the swivel shell 83 can be tailored for a specific design by adjusting contact areas, surface finishes, textures, surface coatings and surface treatments.

Figure 17B:
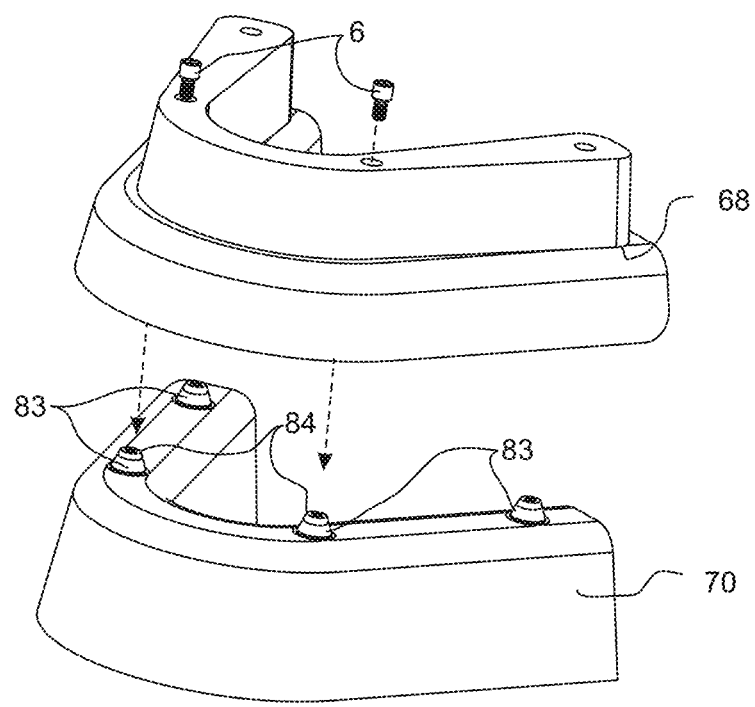
FIG. 17B is a side perspective view of a representative embodiment of another dental prosthesis that is installed using a plurality of multi-unit abutments and implants.
Figure 22:
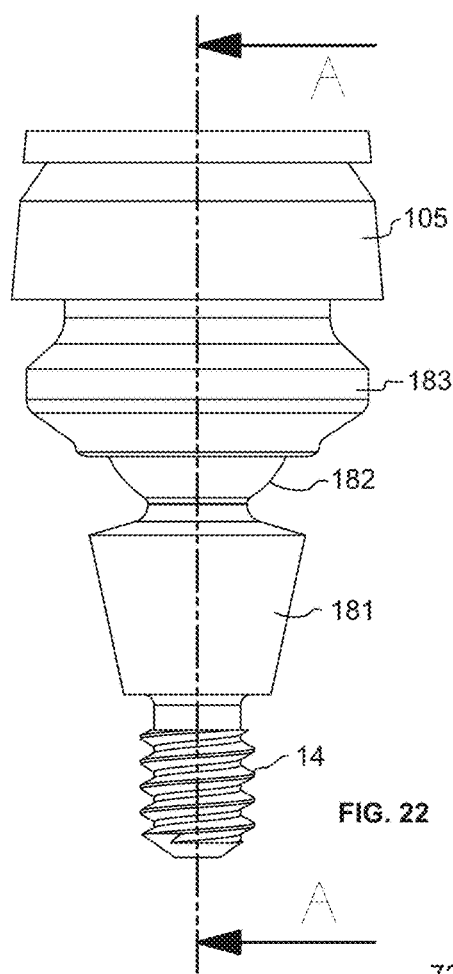
FIG. 22 is a side plan view of an embodiment of an omnidirectional multi-unit abutment assembly using a snap-on coping.

FIG. 17A shows a cross-section of the application environment of an installed omnidirectional multi-unit abutment 80. Implant 16 has been installed in the patient's bone and soft tissue shown schematically as 70. The abutment base 81 has been screwed into the implant 16 to a desired torque level. In this case, the swivel shell 83 has been tilted to essentially its maximum capability. The Ti base 5 is embedded in prosthesis 68. The occlusal surface 72 of the prosthesis is shown schematically. The Ti base 5 is seated on the swivel shell 83, but the prosthetic screw 6 has been removed to allow the lock screw interface 8 to be accessible to a lock screw drive tool 71 through prosthetic screw access hole 69. It may be beneficial to be able to make changes in omnidirectional multi-unit abutment orientation while the prosthesis is in position. FIGS. 17A and 17B will be used to describe this in more detail. FIG. 17B shows the final configuration of a prosthesis 68 with embedded Ti bases 5 (hidden) being mounted to an array of omni-directional multi-unit abutments 85 attached to a jaw 70. The lower portion of the omni-directional multi-unit abutment is hidden in this view, so only a portion of the swivel shell 83 and lock screw 84 are visible.

Although only one implant is shown in FIG. 17A, benefits of in situ adjustment are magnified when the prosthesis includes multiple Ti bases mating to multiple implants. During the fabrication or modification of the prosthesis for implant mounting, uncertainties in Ti base position may be accumulated. Due to the random nature of these shifts, the orientation and position of the Ti bases may drift from each other and from the position of the set of abutments initially used to orient the Ti bases with the prosthesis. Even if the Ti bases are positioned perfectly initially, the shape of the patient's jaw or the prosthesis may change over time. As shown in FIG. 17A, removing the prosthetic screws 6 allows the lock screws 84 to be accessed and loosened with drive tool 71 through the Ti base 5. A benefit of having sufficient friction to tighten the lock screw 84 with only lock screw drive tool 71 is that the lock screw 84 can also be loosened with only lock screw drive tool 71. Applying a re-seating force to the prosthesis 68 from the occlusal side 72 will push the embedded Ti bases 5 against the Ti base seats 92, thereby redirecting the orientation of the omnidirectional multi-unit abutment. Tightening the lock screws 84 with the drive tool 71 inserted through the coping 5 while maintaining the reseating force on the prosthesis 68 will lock this orientation. The prosthetic screws 6 can then be reinserted and torqued to secure the Ti bases 5 and prosthesis 68 in position as shown in FIG. 17B. If it is desirable to check the torque on the lock screws 84 to see if they have loosened over time, this can also be done through the Ti bases 5 embedded in prosthesis 68.

Similarly, if one omnidirectional multi-unit abutment 85 of a set fails and needs to be replaced, the prosthesis 68 with its embedded Ti bases 5 can be removed after removing all of the prosthetic screws 6. Reversing the angle setting and implant attachment processes shown in FIGS. 13-15 will remove the failed omnidirectional multi-unit abutment assembly 85. Repeating the process of FIG. 13 to attach the new omnidirectional multi-unit abutment 85 to the implant 16 will result in the abutment base 81 being secured into the implant 16, but the swivel shell 83 and lock screw 84 will reorient with sufficient force. The swivel shell 83 without any clamping pressure from the lock screw 84 is sufficient to fix the orientation of the omnidirectional multi-unit abutment so that gravity doesn't cause it to move, while only requiring a minimal force application to change its orientation. Rough positioning of the swivel shell 83 sufficient to engage the Ti base 5 in the prosthesis 68 and manually applying pressure to the prosthesis from the occlusal side 72 will reorient the newly installed omnidirectional multi-unit abutment to align it with the Ti base 5 already installed in the prosthesis. In this manner building a custom alignment jig to try to reduce trial and error orientation and maintain original passive fit is not necessary. The lock screw 84 can then be tightened through the aperture 23 in the Ti base 5 in proper position as shown in FIG. 17. Whether the prosthetic screws 6 from the original omnidirectional multi-unit abutments 80 are used to maintain the alignment pressure on the newly installed omnidirectional multi-unit abutment 80 before tightening the lock screw 6 is optional.

Since the lock screw drive interface 8 is accessible through the Ti base 5 and prosthesis 68, a variation of the one-screw passive fit testing protocol may be used to make minor adjustments to the orientation of the omnidirectional multi-unit abutment to improve passive fit at the time of original installation. There are different options for exploiting the ability to reorient the omnidirectional multi-unit abutment 85 through the apertures 23 of the Ti bases 5 installed in prosthesis 68. In one approach, all of the prosthetic screws 6 are removed. While the prosthesis 68 remains in place, all of the omnidirectional multi-unit abutment lock screws 84 are loosened and then made finger tight, if desired, to provide additional frictional forces resisting, but not preventing swiveling slip. The actual finger tight torque value for being appropriately loosely constrained will depend upon the construction and surface finish of the omnidirectional multi-unit abutment but will generally be less than a few N-cm. Next, all of the prosthetic screws 6 are reinstalled and torqued to the recommended value. In this manner, the orientation of each of the omnidirectional multi-unit abutments will be more closely matched to prosthesis 68. Next, a single prosthetic screw 6 is removed to provide access to the lock screw 84 of the omnidirectional multi-unit abutment in that position. The lock screw 84 is torqued to its predetermined value. The prosthetic screw 6 is reinserted and torqued to the predetermined value. This is repeated until all of the omnidirectional multi-unit abutment lock screws 84 have been tightened and all prosthetic screws 6 are tightened.

The fine adjustment process above may be modified depending upon the particulars of the initial level of passive fit. For example, it may be desirable to only loosen some of the omnidirectional multi-unit abutment lock screws 84 while leaving others fixed as anchor points from the original prosthesis fitting. This may result from a requirement to compromise passive fit somewhat for better occlusion or other reasons. Or the results of the traditional one screw or screw resistance tests may suggest orientational adjustment of only a subset of the omnidirectional multi-unit abutments or a different order of adjustment. In any case, these passive fit improvements follow directly from the capability of orienting and fixing the omnidirectional multi-unit abutment while the prosthesis is in place.

It is preferred that the omnidirectional multi-unit abutment system assembly 85 embodiment above be adapted to be compatible with Ti bases 5 and threaded implants 16 that have already been qualified and commercially successful. The threading and seating to widely available implants improve the inventory equation since the same implants may be used with conventional straight abutments as well as the embodiments above in the same patient. While less critical, the compatibility with widely available screw-attached Ti bases 5 is also seen as an advantage. However, inventive features of the described embodiments can be integrated into or adapted to work with newly designed implants that adopt inventive concepts for passive fit improvement or installation efficiency and repair described above. These inventive concepts can also be adapted to work with prostheses that are not attached with screws, such as snap-on retention systems. These adaptations are not excluded and are considered to be disclosed herein and within the scope of claims that may be broadly interpreted to apply to them. US Patent 11,311,354, incorporated by reference as if recited in full herein, includes different approaches for aligning Ti bases with abutments for incorporation into a prosthesis using a temporary fastener in a lift-off process. The basic design of the temporary fasteners illustrated in that co-owned patent can be employed with the omnidirectional multi-unit abutments and Ti bases described above.

FIGS. 18 and 19 show an exploded top and bottom view of an omnidirectional multi-unit abutment system 180 that comprises snap-on attachment. As an alternative to the screw attachment of the prosthesis, many of the features above that are not specific to prosthetic screws and screw attached copings may be adapted. As a result, the illustrations and discussion will assume that the base 181 is basically the same as base 81 and that the ball 182 is captured by inelastically deforming the distal portion of the swivel shell 183 as described above for swivel shell 83. Lock screw 184 is shaped to engage the ball portion 182 in a similar manner as lock screw 84 as the embodiment of FIGS. 8-17B. The exterior profiles of the lock screw 184 and swivel shell 183 are adapted to provide a snap fit when cap 105 and retention liner 106 are forced down onto the proximal side of the multi-unit abutment. The cap 105 and retention insert 106 may be considered to provide the same orientation and attachment functionality as the copings 5 and prosthetic screws 6 described above. Cap 105 is generally metallic but can be made from a wide array of engineering materials used in dentistry. Although a cap or lock screw with integral snap capability may be used as an alternative to the two-piece system shown, commercially available snap abutment systems generally package and provide a single metal cap with a variety of different elastomeric retention inserts for processing, and temporary or semi-permanent attachment. In general, lower retention inserts are selected when a prosthesis is being snap attached to multiple abutments, particularly if the axes of the abutments are not all parallel. Since this disclosure provides a way to provide flexible orientation of multi-unit abutments, a smaller range of retention insert forces may be used in an individual patient. The cap 105 illustrated has an optional access aperture 124 to allow lock screw drive tool 71 to be inserted through the cap 105 to engage the lock screw drive interface 108 or to allow implant drive tool 17 to engage drive feature 10. Retention insert 106 may have optional access aperture 123 for the same purpose.

Although the retention insert 106 is shown as lining the distal surface of the cap 105, it could also be of the form of a flat or domed profile ring or even an O-ring (not illustrated). Particularly in ring form, it may be desirable to attach the ring to the lock screw 184 and swivel shell 183 before snapping on the cap 105. Unlike previous embodiments, the proximal surface of the lock screw 184 has a larger diameter than the proximal surface of the swivel shell 183. A surface profile 187 with a protuberance or indentation is not required but may be useful in the snap action. An optional O-ring 185 is included as an additional sealing member between the swivel shell 183 and lock screw 184. Optionally, the retention insert 106 may also be designed to extend across any joint between the swivel shell 183 and lock screw 184 to provide a seal for this interface. Although a relatively large threaded interface is shown between the lock screw 184 and swivel shell 183, these are design options when cold forming is used to capture the swivel shell on the ball. Two-piece swivel shells or two-piece ball base assemblies are also possible with the snap-on systems but are not preferred.

Figure 23:
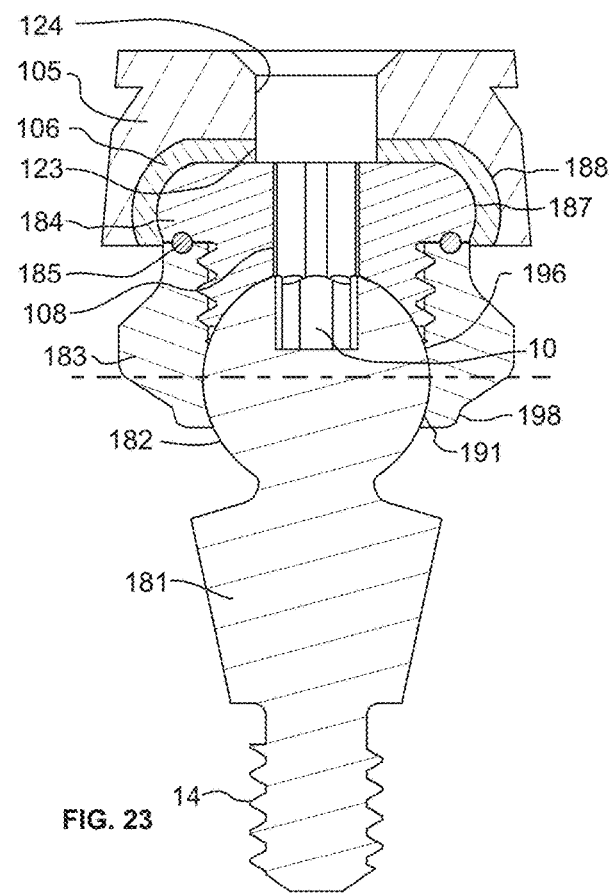
FIG. 23 is a cross-sectional view of the omnidirectional multi-unit abutment assembly using a snap-on coping of FIG. 22 taken through the longitudinal axis.

The cross-sectional view of the assembled multi-unit abutment system with snap attachment 180 is shown in FIG. 23. As was the case with the previous embodiment, the distal end 198 of swivel shell 183 is inelastically deformed using the ball portion 182 as a backing to create reduced aperture 91 (FIG. 11B). As in the previous embodiment, rotary swaging is a preferred method to produce radially inward forces for frictional holding of the swivel shell 183 on the ball portion 182. FIG. 23 shows intimate contact along surface 196 of the one-piece swivel shell 183 with the ball both axially above and extending below the dotted line of the equator after forming. The characteristics and benefits of cold forming, and preferentially rotary swaging, of this one-piece swivel shell configuration follow directly from the previous discussion. However, other metal forming processes may be used as long as the process can consistently generate the desired shape/deformation and retain minimum wall thickness without inducing material weakness. The swivel shell and ball interaction when the means of coping attachment is prosthetic screw torquing can be applied when the means of coping attachment is a snap fit, a shape memory material shift or other mechanical attachment means known in dentistry. Since the one-piece swivel deformation processing and benefits are not dependent upon what means are used to attach the coping to the implant abutment, it is not necessary to repeat those shared details here.

As in previous embodiments, the drive feature 108 in the lock screw 184 allows passage of implant drive tool 17 to engage the drive feature 10 of the base 181 and tighten it to a desired torque. After repositioning to a desired angle, drive feature 108 in the lock screw 184 may be tightened to clamp the ball 182 between lock screw 184 and swivel shell 183. Repositioning may be done with cap 105 and retention insert 106 snapped onto the abutment as illustrated. If either the cap 105 or retention insert 106 do not have apertures, it is not possible to loosen or tighten lock screw with the system 180 snapped together.

Figure 24:
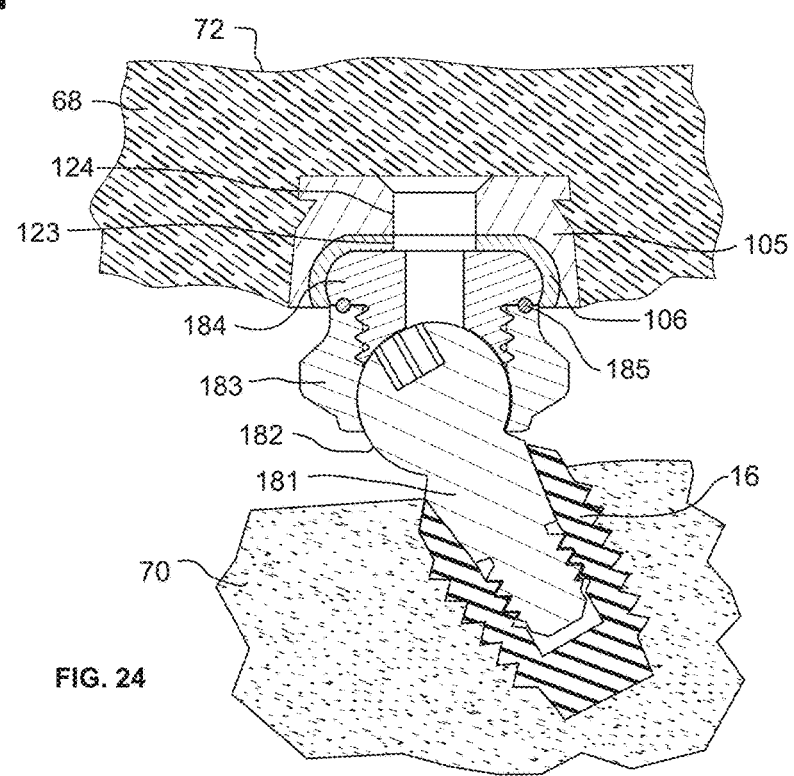
FIG. 24 is a cross-sectional view of the application environment of a representative embodiment of an omnidirectional multi-unit abutment with snap-on coping including prosthesis and implant.

Even if the cap 105 and retention insert 106 have apertures 124 and 123, access for angular adjustment may be blocked. In particular, if cap 105 is embedded in a prosthesis 68 through a lift-off process, there may not be an access hole through the prosthesis to the cap analogous to screw access hole 69 in FIG. 17. This situation is illustrated in FIG. 24 where cement has been blocked from entering the cap aperture 124, but no access boring through the prosthesis is available. A hole could be bored through the prosthesis to provide access to tighten the lock screw 184 or adjust the angle of the multi-unit abutment to make this similar to that illustrated in FIG. 17A. This may not be desirable, since the absence of any boring for screw access is one distinguishing benefit of snap-on abutment systems. Generally, lower force retentive inserts with wider angular mismatch capability must be used to compensate for a greater angular divergence in snap-on abutment axes. Any improvement in relative parallelism of multiple snap-on abutments is a desirable result since forces on retentive inserts will be more uniform. This redistribution of forces can make the processes of snapping the prosthesis on and off abutments easier and reduce stress on both the prosthesis and implants.

A variation of the process described above for screw-attached prostheses can also be used with the snap on system 180. Referring to FIG. 24, for final fixing, the lock screw 184 must be tightened sufficiently to prevent the orientation of the lock screw 184 and swivel shell 183 from moving when the prosthesis 68 with embedded caps 105 and retention liners 106 is snapped into position or removed. If the retentive insert 106 is eliminated entirely or replaced with a thinner or a more readily compressible insert, the snap retention force can be eliminated or reduced as desired to exert less force on the orientation of the lock screw 184 and swivel shell 183 during prosthesis removal after alignment. With lower or no snap retentive forces, adjustment of the orientation of the abutment surfaces by using force applied to the prosthesis through the embedded caps 105 to apply reorienting forces on multi-unit abutments with lock screws 184 that are not fixed to final torques can be performed. Using a retention liner 106 that does not snap into position may be desirable similar to the no retention processing liners used with some fixed angle snap systems to prevent orientation changes of the multi-unit abutment when the prosthesis is subsequently removed to more firmly tighten lock screws 184 and fix the multi-unit abutment in this position. Depending upon desired angular precision, the final snap retention liner 106 may be removed to simply use the cap 105 without the retention liner 106 to shift the orientation of the lock screw 184 and swivel shell 183 of the multi-unit abutment using the prosthesis 68. The distal interior surface of the cap 105 may contact the proximal surface of the lock screw 184 to reorient the lock screw. A spacer (not shown) optionally may be held in drive feature 108 if maintaining vertical distances comparable to the flat thickness of the retention insert 106 is of concern. In this way, a bore hole does not have to be made for tool access through the prosthesis since the lock screw is tightened after the prosthesis 68 and embedded caps 105 are removed. A final retentive insert 106 having the desired compressibility can be subsequently installed in cap 105 and the prosthesis 68 snapped into position. In this manner fabrication of a custom alignment jig (not illustrated) may be avoided in aligning a single replacement snap-on multi-unit abutment in an existing set of multi-unit abutments as described for the screw-attached embodiments.

As mentioned above, the apertures 123 and 124 are optional. If not included in the cap 105 or retention insert 106, it is not possible to tighten the lock screw 184 to fix the orientation of the swivel shell of the complete assembly. As noted, deformation of the retention insert helps take up some of the angular misalignment between multiple multi-unit abutments associated with a single prosthesis. Even if all multi-unit abutments are perfectly aligned initially, over time the prosthesis or the patient's jaw may change shape decreasing the passive fit. An overly rigid system does not mimic the movement of natural teeth. An alternate approach that can be employed is to tighten the lock screw to a level sufficient to hold the swivel shell in position to allow the prosthesis to snap into position, but allow the retention inserts to move the swivel shells to equilibrate the stresses to provide a more passive fit. If the prosthesis or jaw geometry changes over time, the swivel shells would readjust orientation to redistribute forces to obtain a more passive fit in this new geometry. The force required to reorient the swivel shells for self-adjustment would depend upon geometries and mechanical properties of the parts. As described earlier with the embodiment of FIG. 11, a residual clamping force of a swivel shell 83 to a ball 82 through metal cold working deformation to form reduced aperture 91 can be created without any lock screw tightening is preferred.

FIGS. 25A and 25B show a side isometric view of an orientation tool 196 for a prosthetic screw-attached omni-directional multi-unit abutment comprising threaded post 190, spring collar 191 and low friction washer 194. This tool may be used to more easily change the angle of the swivel shell 83 in the following manner. The post 190 has a distal end with threading 193 compatible with the threading 7 of the lock screw 84 for the prosthetic screw 6, a proximal end 205 and a groove 204 in the central portion. A low friction washer 194 is positioned on the post 190 in a proximal direction from the threaded region 193. Spring collar 191 has spring fingers 192 formed by forming slots 195 axially at the proximal end. These spring fingers 192 are constrained to move axially in a groove 204 of the post 190. The spring fingers 192 riding in the groove 204 allow axial movement of the spring collar 191 relative to the post 190 over a limited distance. At the distal end of spring collar 191 is a lower aperture 201 and a distal wall portion 202 terminating with a shape matching the seating surface 92 of the swivel shell 83.

At initial installation into the implant 16 (not shown), the swivel shell 83 will be aligned with the linear axis of the abutment base 81 as shown in FIGS. 26 and 27. The lock screw 84 will generally not be tightened at this stage to fix the orientation of the swivel shell 84. By partially engaging the threading 193 into the threads 7 of the lock screw 84 by pressing down on the collar 191 or post 190 as shown in FIG. 27 such that the washer 196 does not make contact with the lock screw 84. There is a gap 196, The orientation of the swivel shell can be changed by pushing on the post 190 or collar 191. When the desired orientation is obtained, post 190 may be further rotated to eliminate the gap 196 and bottom out the washer 194 and subsequently tighten the lock screw 84 to fix the orientation as shown in FIG. 28. The tool 196 may remain in position temporarily as a visual indication of orientation angle. Due to the low-friction property of the washer 194 being made of PTFE or other similar materials, the lock screw 84 will not loosen after torquing when the rotation direction of tool 196 is reversed. Materials may be stainless steel, Ti, PEEK depending upon whether the tool 196 is meant for one-time or multiple use.

Various embodiments have been described to illustrate the disclosed inventive concepts, not to limit the invention. Threaded elements have been described generally as being assembled to a desired torque value either quantitively or qualitatively. As an alternative, threaded elements may also be assembled to a desired depth limited by seating contact or limiting the number of threads available on a part. Due to greater flexibility, a threaded connection of an implant with a multi-unit abutment is preferred. However, some multi-unit abutment features detailed above can be incorporated directly into the implant or can be connected to the implant by other than threaded connection. There may be benefit in employing some inventive concepts without the preferred interface between the implant and the abutment as described above. The preferred interface described should not be interpreted as limiting. Although essentially spherical balls have been illustrated to demonstrate inventive concepts and provide maximum orientational flexibility, other shapes may be used to intentionally restrict orientation. Mating interfaces may be tailored to meet objectives in embodiments that have not been presented that still use one or more of the inventive concepts illustrated.

Combining inventive elements of one or more of the embodiments with known materials, components and techniques in dental science to create further embodiments using the inventive concepts is considered to be part of this disclosure.

That which is claimed:

1. A system for alignment and attachment of a dental prosthesis to an implant, the system comprising:

an abutment base, the abutment base comprising a proximal end portion comprising a ball with an abutment base drive interface and a distal end comprising screw threads for attachment to the implant, wherein the ball comprises an equator;

a swivel shell comprising a proximal end portion and an opposing distal end portion, an inner surface, and an outer surface, wherein the swivel shell further comprises an open internal channel extending between the proximal end portion and the distal end portion, wherein the open internal channel comprises threads, and wherein the swivel shell has an interference fit against the ball and contacts the ball above the equator of the ball and below the equator of the ball when the abutment base and the swivel shell are in longitudinal alignment whereby the swivel shell is able to tilt and rotate in response to forces applied to the swivel shell above a defined force; and a lock screw, wherein the lock screw comprises a portion with external threads, wherein the external threads threadably engage with the threads of the open internal channel of the swivel shell, and wherein the lock screw comprises an open internal channel that extends in a longitudinal direction and is configured to align with the abutment base drive interface, wherein the swivel shell is configured to press against the ball with sufficient force to retain a desired orientation without the lock screw.

2. The system of claim 1, wherein the swivel shell has a deformable wall at a distal end portion thereof so that the deformable wall is configured to have a first configuration for assembly to the ball that deforms to a second configuration to capture the ball in the swivel shell whereby the swivel shell frictionally engages the ball above and below the equator of the ball when the abutment base and the swivel shell are in longitudinal alignment to retain the desired orientation without the lock screw.

3. The system of claim 2, wherein the swivel shell has a single piece monolithic metal body with an inner surface configured to provide the ball contact surfaces above the equator of the ball and below the equator of the ball when the abutment base and the swivel shell are in longitudinal alignment and when the swivel shell is in the second configuration, and wherein, in the second configuration, the swivel shell has a minimum wall thickness at a deformation region of the distal end portion that is in a range of about 0.1 mm to about 0.25 mm.

4. The system of claim 2, wherein, with the distal end portion of the swivel shell in the second configuration, the swivel shell is configured to frictionally engage the ball with sufficient retention force to prevent axial movement relative to the abutment base, and wherein the swivel shell captures the ball prior to assembly with the lock screw as a result of upper and lower hemisphere forces on opposing sides of the equator on the ball in the second configuration whereby a swivel shell minimum retention force providing the desired orientation is factory preset independent of the lock screw for field installation with the lock screw.

5. The system of claim 2, wherein the distal end portion of the swivel shell is deformable to the second configuration as a rotary swaged configuration configured to capture the ball whereby the rotary swaged configuration is configured to occur while applying an axial load in a proximal direction to the swivel shell with the ball held in the swivel shell.

6. The system of claim 1, further comprising a dental coping, wherein a portion of the lock screw extends outside the swivel shell a distance in a direction proximal to the swivel shell, and wherein the dental coping is sized and configured to enclose the portion of the lock screw that extends outside the swivel shell and a subset of the swivel shell.

7. The system of claim 1, wherein the swivel shell is configured to tilt and/or rotate relative to the ball when an applied torque of above 1.5 N-cm is applied thereto.

8. The system of claim 1, wherein, when the abutment base and the swivel shell are longitudinally aligned, the inner surface of the swivel shell defines a contact surface with the ball that, when viewed from a side, is in a range of about 10 degrees to about 45 degrees on both sides of the equator, and wherein the contact surface with the ball above the equator is greater than the contact surface with the ball below the equator.

9. The system of claim 1, wherein the open channel of the lock screw comprises threads sized and configured to engage a prosthetic screw, the system further comprising the prosthetic screw, wherein the prosthetic screw threadably engages the threads of the open channel of the lock screw while the lock screw is threadably engaged to the threads of the swivel shell.

10. The system of claim 9, wherein a distal end of the prosthetic screw terminates at a location spaced apart from the ball inside the swivel shell.

11. The system of claim 1, wherein the open channel of the lock screw is devoid of screw threads, wherein the system further comprises a snap-on cap that is sized and configured to engage the proximal end portion of the swivel shell to attach the dental prosthesis to the abutment base, and wherein the snap on cap is affixed to a Ti base coupled to an internal side of the dental prosthesis.

12. The system of claim 1, further comprising a snap-on cap that is sized and configured to engage the proximal end portion of the swivel shell, wherein at least some of the proximal end portion of the swivel shell resides inside the snap-on cap.

13. The system of claim 1, wherein the lock screw is configured to be rotatable to tighten against the ball and cooperates with the swivel shell whereby the swivel shell alone provides a holding force against the ball to be at a desired angle relative to the ball without the lock screw and the lock screw is configured to increase a holding force against the ball relative to the holding force applied by only the swivel shell, and wherein the swivel shell is configured to hold the ball with sufficient force to allow the lock screw to be tightened in the swivel shell when the abutment base is attached to the implant to affix an orientation of a longitudinal axis of the swivel shell that is not parallel to a longitudinal direction of the abutment base.

14. The system of claim 1, further comprising a coping, wherein the coping has an aperture on a proximal end that is larger than a shaft of a prosthetic screw and smaller than a head of the prosthetic screw, and wherein the coping has a distal end that is shaped to reside against a seating surface provided by the outer surface of the swivel shell, and wherein the seating surface resides below a proximal end of the ball when the swivel shell and abutment base are longitudinally aligned.

15. The system of claim 1, further comprising an abutment base drive tool with a tip end portion that is sized to pass through the lock screw.

16. The system of claim 1, further comprising a coping and a lock screw drive tool, wherein the coping has an aperture on the proximal end that is larger than a shaft of a prosthetic screw and smaller than a head of the prosthetic screw, wherein an installation orientation of the swivel shell is configured to be selectively made by tilting the lock screw drive tool away from a longitudinal direction of the abutment base and tightening the lock screw to a defined torque or to a torque within a defined torque range, and wherein the lock screw drive tool is sized to pass through the aperture of the coping without interference.

17. The system of claim 1, wherein, when the abutment base and the swivel shell are longitudinally aligned, the inner surface of the swivel shell defines a contact surface with the ball that, when viewed from a side, is in a range of about 10 degrees to about 45 degrees on both sides of the equator, and wherein the contact surface with the ball below the equator is discontinuous between a distalmost end and the equator.

18. A system for alignment and attachment of a dental prosthesis to a dental implant comprising:
 a base comprising an abutment drive interface for screw attachment to the dental implant, the base comprising a first end having a ball and a second end with a post, and wherein the post is configured to threadably engage the dental implant;
 a swivel shell comprising an open channel with internal threads; and
 a lock screw with external threads threadably engaged to the internal threads of the swivel shell,
 wherein the ball is captured inside the open channel of the swivel shell with the post extending distal of the open channel, wherein the swivel shell is sized and configured to hold itself against the ball throughout advancement of the lock screw to an installation position in the swivel shell, and wherein the lock screw is configured to rotatably advance in the swivel shell to increase pressure on the ball above that provided by the swivel shell alone whereby the swivel shell cooperates with the ball to frictionally engage the ball with sufficient force to initially fix orientation of the swivel shell relative to the ball without the lock screw in the installation position in the swivel shell.

19. The system of claim 18, wherein the ball has an equator and a longitudinal axis, wherein the swivel shell has a deformable wall at a distal end portion thereof so that the deformable wall is configured to have a first configuration for assembly to the ball that deforms to a second configuration to capture the ball in the swivel shell, and wherein the swivel shell frictionally engages the ball above and below the equator of the ball when the swivel shell and the post are longitudinally aligned whereby the longitudinal axis of the ball is aligned with a longitudinal axis of the swivel shell.

20. The system of claim 18, wherein the swivel shell has a single piece monolithic metal body, and wherein, in the second configuration, the swivel shell has a minimum wall thickness at a deformation region of the distal end portion that is at least about 0.1 mm.

21. The system of claim 18, further comprising a dental coping, wherein the dental coping is sized and configured to enclose the lock screw and a subset of the swivel shell when the base and the swivel shell are longitudinally aligned, wherein the dental coping comprises a mounting interface at a distal end thereof configured to mount on a seating surface on an exterior surface of the swivel shell, wherein the seating surface resides below a proximal end of the ball when the base and the swivel shell are longitudinally aligned, and wherein the system further comprises a one drive tool configured to be inserted through an aperture in the dental coping to engage the lock screw.

22. The system of claim 18, wherein the lock screw has a proximal end portion configured to engage a snap-on coping, and wherein the snap-on coping comprises a compressible structure.

23. The system of claim 18, wherein the swivel shell is configured so that a force applied in a distal direction to the dental prosthesis containing an embedded coping results in a force applied to an interface with the swivel shell sufficient to change an orientation of the swivel shell relative to the ball.

24. The system of claim 18, further comprising a coping with a tapered inner surface that abuts a tapered outer surface of the swivel shell, wherein the coping and swivel shell are cooperatively configured so that a force applied in a distal direction to the coping forces the swivel shell to change orientation relative to the ball.

25. The system for alignment of claim 24, wherein the coping has a coping aperture positioned adjacent a proximal end of the tapered inner surface, wherein the lock screw has a lock screw drive interface located in an open through channel of the lock screw, wherein the lock screw drive interface is matable to a drive tool, and wherein the drive tool is insertable through the coping aperture to engage the lock screw drive interface.

26. The system of claim 18, wherein the lock screw is an annular lock screw with an open channel, wherein a portion of the lock screw extends external of the swivel shell in a proximal direction, wherein the portion of the lock screw that extends external of the swivel shell has an outer surface that tapers outward in a distal direction, and wherein the open channel of the lock screw comprises threads for engaging a prosthetic screw and a lock screw drive interface.

27. A system for alignment and attachment of a dental prosthesis to a dental implant, comprising:
 an abutment base, the abutment base comprising a proximal end portion comprising a ball with an abutment base drive interface and a distal end comprising screw threads for attachment to the implant, wherein the ball comprises an equator; and
 a swivel shell comprising a proximal end portion and an opposing distal end portion, an inner surface, and an outer surface, wherein the swivel shell further comprises an open internal channel extending between the proximal end portion and the distal end portion, wherein the open internal channel comprises threads sized and configured to engage external threads of a lock screw,
 wherein the swivel shell slidably holds the ball and contacts the ball above and below the equator of the ball when the abutment base is longitudinally aligned with the swivel shell,
 wherein the swivel shell is configured to capture the ball to prevent axial movement relative to the abutment base and provide a desired tilt orientation in a range of about 0 degrees to about 30 degrees,
 wherein the swivel shell captures the ball prior to assembly with a lock screw as a result of upper and lower hemisphere forces on the ball whereby a swivel shell minimum retention force is factory preset independent of the lock screw for field installation with the lock screw,
 wherein the outer surface of the swivel shell comprises a seating surface sized and configured to couple to a dental coping, and wherein the seating surface projects outward and resides below a proximal end of the ball when the abutment base and the swivel shell are longitudinally aligned.

28. A system for alignment and attachment of a dental prosthesis to a dental implant, comprising:
- an abutment base, the abutment base comprising a proximal end portion comprising a ball with an abutment base drive interface and a distal end comprising screw threads for attachment to the implant, wherein the ball comprises an equator; and
- a swivel shell comprising a proximal end portion and an opposing distal end portion, an inner surface, and an outer surface, wherein the swivel shell further comprises an open internal channel extending between the proximal end portion and the distal end portion, wherein the open internal channel comprises threads sized and configured to engage external threads of a lock screw,
- wherein the swivel shell slidably holds the ball and contacts the ball above and below the equator of the ball when the abutment base is longitudinally aligned with the swivel shell,
- wherein the swivel shell is configured to capture the ball to prevent axial movement relative to the abutment base and provide a desired tilt orientation in a range of about 0 degrees to about 30 degrees,
- wherein the swivel shell captures the ball prior to assembly with a lock screw as a result of upper and lower hemisphere forces on the ball whereby a swivel shell minimum retention force is factory preset independent of the lock screw for field installation with the lock screw,
- wherein the swivel shell has a distal end wall segment that is configured to inelastically deform from a first configuration to a second configuration to contact the ball thereat in the second configuration, and wherein, in the second configuration, the distal end wall segment has a discontinuous wall contact surface with the ball between a distalmost end and the equator when the swivel shell and the abutment base are longitudinally aligned.

29. The system of claim 28, wherein the distal end wall segment seals against the ball.

* * * * *